United States Patent
Togino et al.

(10) Patent No.: US 8,072,693 B2
(45) Date of Patent: Dec. 6, 2011

(54) OPTICAL SYSTEM

(75) Inventors: Takayoshi Togino, Shibuya-Ku (JP); Shin Nakamura, Toshima-Ku (JP)

(73) Assignee: Olympus Corporation, Tokyo (JP)

( * ) Notice: Subject to any disclaimer, the term of this patent is extended or adjusted under 35 U.S.C. 154(b) by 155 days.

(21) Appl. No.: 12/308,489

(22) PCT Filed: May 15, 2007

(86) PCT No.: PCT/JP2007/060305
§ 371 (c)(1),
(2), (4) Date: Dec. 15, 2008

(87) PCT Pub. No.: WO2007/145050
PCT Pub. Date: Dec. 21, 2007

(65) Prior Publication Data
US 2010/0238568 A1    Sep. 23, 2010

(30) Foreign Application Priority Data
Jun. 15, 2006  (JP) ................. 2006-165975

(51) Int. Cl.
*G02B 13/06* (2006.01)
*G02B 17/00* (2006.01)
(52) U.S. Cl. ............................ 359/725; 359/731
(58) Field of Classification Search ............. 359/725, 359/730, 731
See application file for complete search history.

(56) References Cited

U.S. PATENT DOCUMENTS

| | | | |
|---|---|---|---|
| 3,283,653 A | 11/1966 | Tokarzewski | |
| 3,552,820 A | 1/1971 | Brachvogel | |
| 4,566,763 A | 1/1986 | Greguss | |
| 5,473,474 A | 12/1995 | Powell | |
| 6,646,818 B2 * | 11/2003 | Doi | 359/725 |
| 7,245,443 B2 * | 7/2007 | Togino | 359/725 |
| 7,463,431 B2 * | 12/2008 | Togino et al. | 359/725 |
| 2008/0143822 A1 * | 6/2008 | Wang et al. | 348/36 |

FOREIGN PATENT DOCUMENTS

| | | |
|---|---|---|
| JP | 2003-167195 | 6/2003 |
| JP | 2006-284719 | 10/2006 |
| WO | WO 94/12905 | 6/1994 |

OTHER PUBLICATIONS

International Search Report, Jan. 9, 2007, from International Patent Application No. PCT/JP2007/060305, filed May 15, 2007.

* cited by examiner

*Primary Examiner* — William Choi
(74) *Attorney, Agent, or Firm* — Kenyon & Kenyon LLP

(57) ABSTRACT

An optical system is adapted to form an image having a full 360° angle of view on an image plane. The optical system includes a front unit having at least two reflecting surfaces, each rotationally symmetric about a center axis, and a rear unit that is rotationally symmetric about the center axis and has positive power. The first reflecting surface is located opposite to an entrance pupil, and the second reflecting surface is located on the same side as the first reflecting surface. The entrance pupil in a section including the center axis is located between the outer periphery of the first reflecting surface and the outer periphery of the second reflecting surface. A light beam coming from afar passes through the front unit and the rear unit in order, forming an image at a position of an image plane off the center axis.

13 Claims, 16 Drawing Sheets

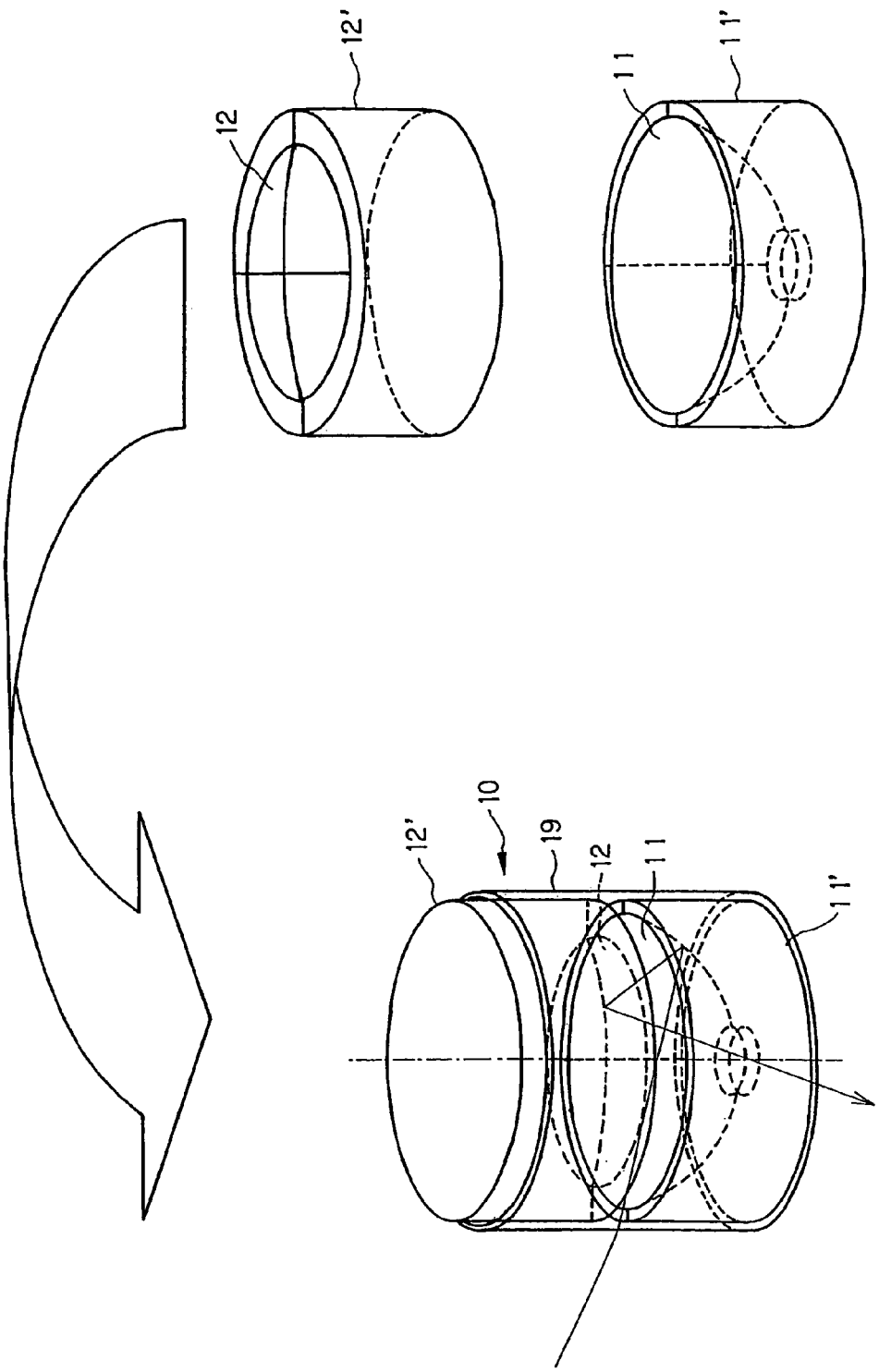

OPTICAL SYSTEM

ART FIELD

The present invention relates generally to an optical system, and more specifically to an optical system that is of small-format size and high resolving power, and that is well suited for use on all sky cameras, all sky projectors, etc., designed to form on an image plane an image having a full 360°-direction angle of view or project an image located on an image plane at a full 360°-direction angle of view.

BACKGROUND OF THE INVENTION

Among prior optical systems using a reflection optical system to obtain full 360°-direction (full-panoramic) images, there is one made up of a front unit comprising a transparent medium that is rotationally symmetric about a center axis and includes two internal reflecting surfaces and two transmitting surfaces and a rear unit that is rotationally symmetric about the center axis and has positive power, as set forth in patent publications 1 and 2.

Patent Publication 1
U.S. Pat. No. 4,566,763
Patent Publication 2
U.S. Pat. No. 5,473,474

A problem with either of patent publications 1 and 2 is, however, that when full-panoramic images are picked up with the optical system directing to the zenith, much harmful flare light coming from the zenithal direction causes image quality to go worse, because the effective diameter of the first transmitting surface grows large as a consequence of an entrance pupil within a section including a center axis being located the center axis.

DISCLOSURE OF THE INVENTION

Such being the case, a main object of the invention is to provide an optical system of small-format size, reduced flare light and high resolving power for taking an image having a full 360°-direction (full-panoramic) angle of view or projecting an image at a full 360°-direction (full-panoramic) angle of view.

According to the invention, the above object is achieved by the provision of an optical system, which is adapted to form an image having a full 360°-direction (full-panoramic) angle of view on an image plane or project an image located on an image plane at a full 360°-direction angle of view, and comprises a front unit having at least two reflecting surfaces, each rotationally symmetric about a center axis, and a rear unit that is rotationally symmetric about the center axis and has positive power, characterized in that:

said front unit includes, in order of travel of light rays in the case of an imaging system or in reverse order of travel of light rays in the case of a projection system, a first reflecting surface on which a light beam coming from afar is incident and which is located opposite to an entrance pupil in a section including a center axis with the center axis interposed between them, and a second reflecting surface located on the same side as the first reflecting surface with respect to the center axis, wherein a center of the first reflecting surface is located more on the rear unit side than a center of the second reflecting surface in a center axis direction, and the entrance pupil in the section including the center axis is located between an outer periphery of the first reflecting surface and an outer periphery of the second reflecting surface, the light beam coming from afar passes through said front unit and said rear unit in order, forming an image at a position of said image plane off the center axis, the entrance pupil is positioned off the center axis in the section including the center axis, and positioned on the center axis in a section that is orthogonal to the section including the center axis, and said rear unit is constructed of an optical system comprising at least two groups and having positive power.

Preferably in this case, said rear unit comprises a rotationally symmetric, coaxial dioptic system.

Preferably, said first reflecting surface has positive power in both the meridional section and the sagittal section.

Preferably, said second reflecting surface has negative power in both the meridional section and the sagittal section.

Preferably, the optical system further comprises an aperture that is located at any image plane side with respect to said front unit coaxially with the center axis.

Preferably, at least one reflecting surface has a rotationally symmetric shape defined by the rotation about the center axis of a line segment of any shape that has no plane of symmetry.

Preferably, at least one reflecting surface has a rotationally symmetric shape defined by the rotation about the center axis of a line segment of any shape that includes an odd-number order term.

Preferably, in the section including the center axis, there is a flare stop located that is adapted to limit an aperture to near an entrance pupil only in the section including the center axis.

Preferably, in order of travel of light rays in the case of an imaging system or in reverse order of travel of light rays in the case of a projection system, there is a relay optical system provided that is adapted to relay an image formed on said image plane to a second image plane.

Preferably, the optical system satisfies the following condition (1):

$$5 < F_b/h0 \quad (1)$$

where $F_b$ is the back focus of said relay optical system, and $h_0$ is the maximum height of the image formed by said relay optical system.

Preferably, the optical system satisfies the following condition (2):

$$10° < |\tan^{-1}(h/f_r)| \quad (2)$$

where $f_r$ is the focal length of said rear unit, and
h is the maximum height of an annular image formed by said front unit.

With the invention as recited above, it is possible to obtain an optical system that is adapted to obtain an image having a full 360°-direction (full-panoramic) angle of view or projecting an image at a full 360°-angle of view, and that is not affected by flare light and reduced in size, and has well corrected aberrations and high resolving power.

BRIEF DESCRIPTION OF THE DRAWINGS

FIGS. 12(a) and 12(b) are illustrative of one of how to set up the front unit in the inventive optical system with only two reflecting surfaces.

BEST MODE FOR CARRYING OUT THE INVENTION

The optical system of the invention is now explained with reference to some specific examples.

Figure 1:
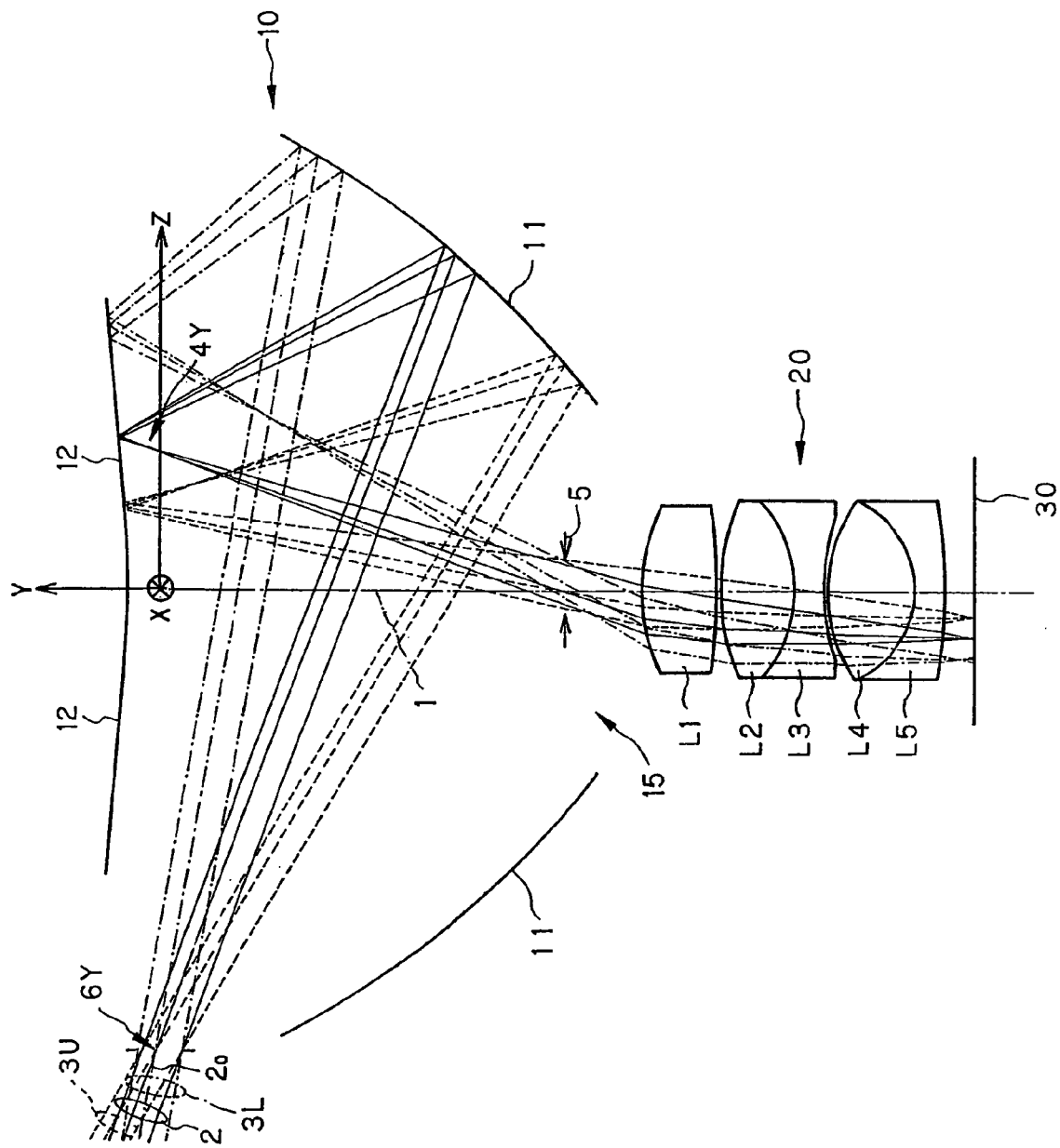
FIG. 1 is a sectional view of the optical system according to Example 1 of the invention, as taken along the center axis.
Figure 2:
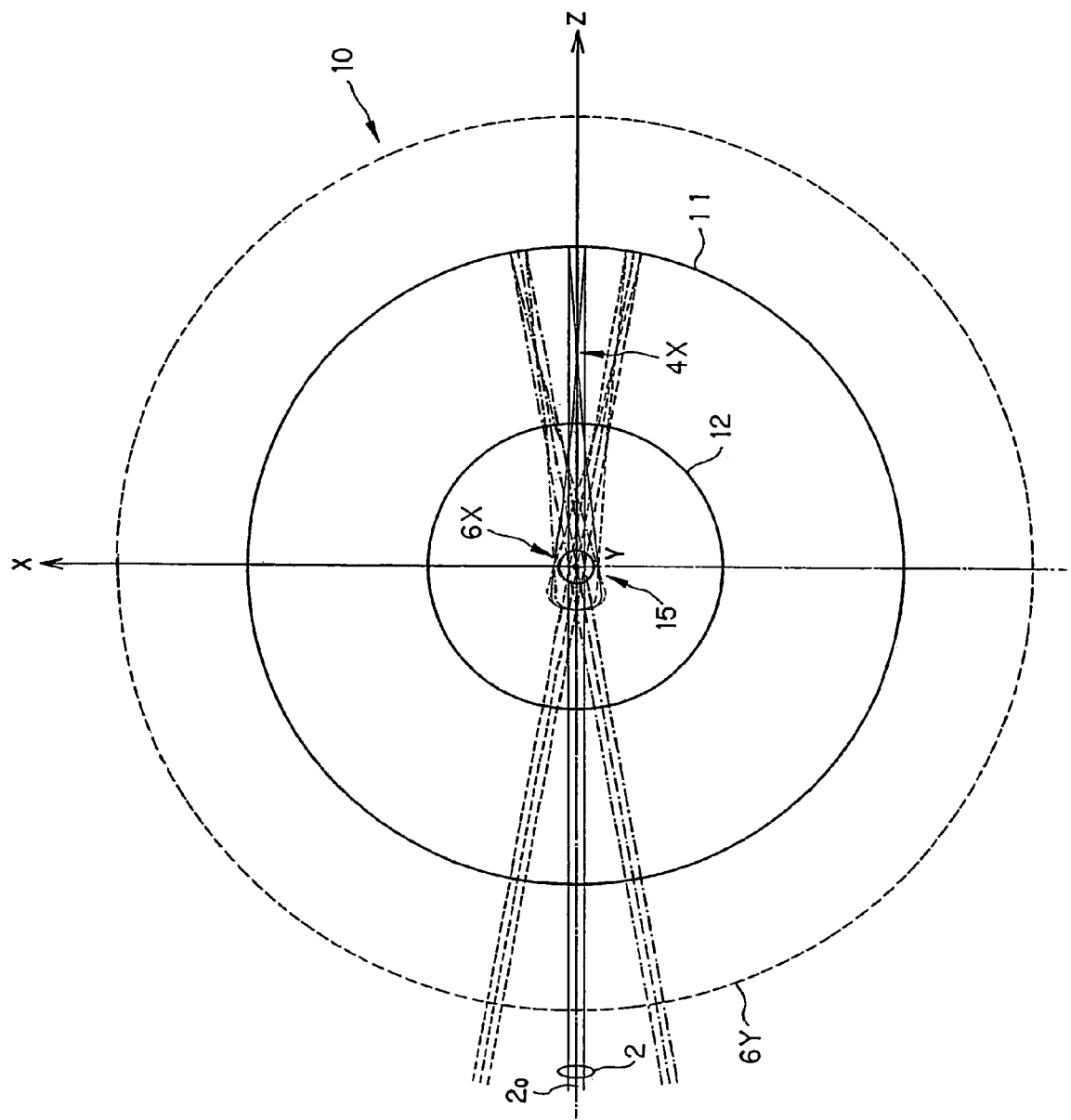
FIG. 2 is a plan view of an optical path through the optical system according to Example 1 of the invention.

FIG. 1 is a sectional view of the optical system according to Example 1, described later, as taken along the center axis (the axis of rotational symmetry), and FIG. 2 is a plan view of an optical path through the optical system. The optical system of the invention is now explained more specifically with reference to FIGS. 1 and 2. Note here that while the optical system will be explained in the form of an imaging optical system, it may just as well be used in the form of a projection optical system by reversing the optical path, which is to project an image in a full-360° (full-panoramic) direction. In FIG. 2, note also that in addition to an optical path coming from the azimuth direction of 0°, there are optical paths coming from directions of ±10°.

The optical system of the invention is built up of a front unit 10 rotationally symmetric about a center axis 1 and a rear unit 20 rotationally symmetric about the center axis 1, and a light beam 2 incident from a far away object is imaged at a position of an image plane 30 vertical to and off the center axis 1 after passing through the front unit 10 and the rear unit 20 in order.

The front unit 10 is built up of a first reflecting surface 11 and a second reflecting surface 12, each being rotationally symmetric about the center axis 1, and the rear unit 20 is built up of a coaxial dioptric optical system comprising a lens system or the like that is rotationally symmetric about the center axis 1 and has positive power.

In the front unit 10, the center of the first reflecting surface 11 (the point intersecting the center axis 1) lies in the center axis 1 direction and is positioned on the rear unit 20 side with respect to the center of the second reflecting surface 12, and an entrance pupil 6Y in a section (meridional section) including the center axis 1 is located between the outer periphery of the first reflecting surface 11 and the outer periphery of the second reflecting surface 12.

And, a light beam 2 incident from afar passes through the entrance pupil 6Y in the meridional section, and enters between the first reflecting surface 11 and the second reflecting surface 12. It is reflected at the first reflecting surface 11 located with the center axis 1 interposed between the object and it in the direction away from an image plane 30, and at then reflected at the second reflecting surface 12 spaced away from the object with the center axis 1 interposed between the object and it. Then, the reflected light enters a stop-forming aperture 5 of round shape located near a hole 15 formed in the center of the first reflecting surface 11 and coaxially with the center axis 1 between the front unit 10 and the rear unit 20, passes through the rear unit 20 of positive power, and finally is imaged at a radially given position of the image plane 30 off the center axis 1.

Thus, the front unit 10 serves to receive a light beam coming from a full-panoramic image toward the rotationally symmetric axis (center axis) 1 to transform it into an annular aerial image, and the rear unit serves to project that annular aerial image onto a plane of an imaging device positioned on the image plane 30. Field curvature and astigmatism that remain under-corrected at the front unit 10 may be corrected such that they are made up for at the rear unit 20.

Then, the stop-forming aperture 5 of round shape interposed between the front unit 10 and the rear unit 20 is back projected by the front unit 10 thereby forming an entrance pupil. The invention is here characterized in that in the meridional section, that entrance pupil is located in the form of a meridional direction entrance pupil 6Y between the outer periphery of the first reflecting surface 11 and the outer periphery of the second reflecting surface 12, whereas, in the sagittal section, it is projected in the form of a sagittal direction entrance pupil 6X onto the center axis (rotationally symmetric axis) 1.

With the prior art (Patent Publication 1), a flare stop for cutting off harmful light could not effectively be located because both the entrance pupil in the meridional section and the entrance pupil in the sagittal section are located on the center axis.

In the invention, to prevent harmful flare light from entering the optical system through the aperture, the entrance pupil 6Y is interposed between the outer periphery of the first reflecting surface 11 and the outer periphery of the second reflecting surface 12 within the meridional section only, and so the edges of the first 11 and the second reflecting surface 12 can be used as a stop for cutting off the flare light. It is thus possible to largely cut off the unessential light entering the front unit 10 and, hence, reduce flares.

Figures 11A, 11B:
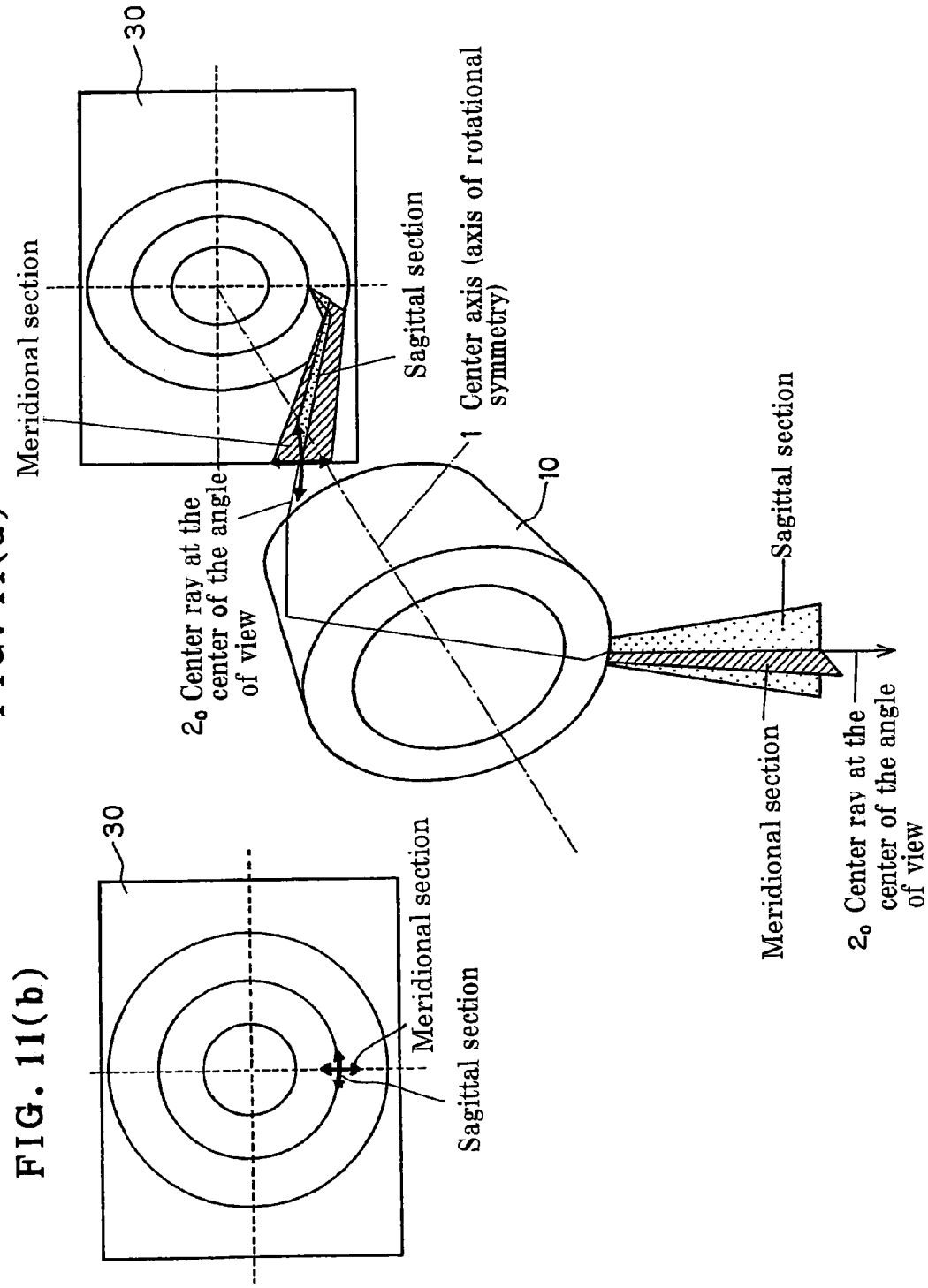
FIGS. 11(a) and 11(b) are illustrative of the definitions of the meridional section and the sagittal section.

Note here that the meridional section, and the sagittal section is defined as shown in FIG. 11. FIG. 11(a) is illustrative in perspective and schematic of the optical path through the inventive optical system, and FIG. 11(b) is illustrative of a section at the center position of the angle of view on the image plane 30. That is, it is the meridional section that includes the center axis (rotationally symmetric axis) 1 of the optical system and the center ray (chief ray) $2_O$ of a center light beam arriving at the center of the angle of view, and it is the sagittal section that is orthogonal to that meridional section and includes the center ray (chief ray) $2_O$.

A mechanical slit-form stop serving as a flare stop may be located at the entrance pupil 6Y position in the meridional section. Alternatively, a casing for the purpose of protecting the optical system or a transparent pipe having a non-transmittable portion painted in black may just as well be used as the flare stop. Yet alternatively, the stop on the lower side of the image plane 30 or the stop opposite to (on the upper side of) the image plane 30 may share the reflective coating portion of the first reflecting surface 11 while the opposite (upper) side of the image plane 30 may share a sand polished and black painted plane instead of an optical surface, because there is a large inaccessible area between it and the second reflecting surface 12.

In the sagittal section, on the other hand, the front unit 10 is a rotationally symmetric system about the center axis (rotationally symmetric axis) 1; the light beam, too, will pass through it rotationally symmetrically so that a light beam having the same image height as the annular image will constantly pass on the center axis 1 that is the center of rotation (see FIG. 2). For this reason, a light beam arriving on the circumference of the annular image corresponding to the direction orthogonal to the center axis 1 will arrive at the image plane 30 once passing on the center axis 1; that is, the aperture 5 back projected in the sagittal section will lie on the center axis 1.

Note here that to make the back projection position of the aperture 5 in the meridional section and the sagittal section different as described above, it is necessary to let the focal length of the front unit 10 differ in the plane including the center axis 1 (in the Y-Z direction) and the plane orthogonal to the center axis 1 (in the X-Z direction).

In the inventive optical system, the curvature in the meridional section of a line segment of any shape that is rotated about the center axis 1 to determine the shape of the first 11, and the second reflecting surface 12, and the then curvature of rotation about the center axis 1, viz., the curvature of the sagittal section is independently determined so that the aperture 5 is back projected to locate the entrance pupil 6Y in the meridional section between the outer periphery of the first reflecting surface 11 and the outer periphery of the second reflecting surface 12. It is thus possible to largely cut off unessential light entering the front unit 10 and, hence, reduce flares.

In the sagittal section orthogonal to the center axis 1, on the other hand, there is a rotationally symmetric system provided; the light beam, too, will pass through it rotationally symmetrically, and so the light beam having the same image height as the annular image will constantly pass on the center axis 1 that is the center of rotation (see FIG. 2). In the sagittal section, accordingly, the light arriving at the image plane 30 on the circumference will arrive at the image plane 30 after passing on the center axis 1, and so the entrance pupil 6X in the sagittal section that is the image of the aperture 5 back projected in the sagittal section will lie on the center axis 1.

Such being arrangement, it is of importance for the front unit 10 to comprise a surface of rotationally symmetric shape that is defined by the rotation about the center axis 1 of a line segment of any shape whose curvature can freely be controlled in both the meridional and the sagittal section. Further in the front unit 10, light is reflected at the decentrated surfaces 11 and 12 having power, giving rise to some large decentration aberrations. To correct them, it is of importance to use for the reflecting surfaces 11, 12 in particular a surface obtained by the rotation of a line segment for which an odd-number order term or the like is used and which is free of any plane of symmetry.

In the inventive optical system, a light beam 2, 3U, 3L (the beam 3U is one coming from a far away place in the sky, and the beam 3L is one coming from a far away place on the ground) coming from afar and through the entrance pupil 6Y is imaged once within the front unit 10 in the section (the meridional section: FIG. 1) including the center axis 1, and imaged at a position 4X between the first 11 and the second reflecting surface 12 in the plane (the sagittal section: FIG. 2) that is orthogonal to the plane including the center axis 1 and includes the center ray $2_0$ of that light beam.

Note here that in Example 1 of FIG. 1, a space between the first 11 and the second reflecting surface 12 of the front unit 10 is defined by air or a vacuum; however, it may be filled up with a transparent medium, for instance, a resin having a refractive index of greater than 1. In that case, transmitting surfaces (entrance and exit surfaces) are formed near the entrance pupil 6Y position and hole 15 in the meridional section so that an optical system of smaller size and with better reduced aberrations is achievable.

Further, to make sure the brightness of an image, the rear unit 20 is preferably configured as a bright optical system; to this end, the rear unit 20 is preferably made up of at least two lens groups.

More preferably, to correct chromatic aberrations occurring at the rear unit 20, at least one of the two lens groups is preferably made up of a cemented lens.

More preferably, in both the meridional and the sagittal section, the first reflective surface 11 has positive power at an area that receives the chief ray 20 at the center of the angle of view in the vertical direction. This means that the first reflecting surface 11 is concave on the center axis 1 side, and is an impeccable requirement for the entrance pupil 6Y to be projected in the opposite direction with the center axis 1 located between them. Otherwise, the entrance pupil cannot be back projected.

More preferably or more importantly, the number of imaging the pupil from the entrance pupil 6Y to the aperture 5 coaxial with the center axis 1 be the same in both the meridional and the sagittal section. If the number of imaging the pupil is one in both the meridional and the sagittal section, it will then be preferable for correction of aberrations, because of easing off loads on the optical surfaces. There should better be at least one positive power on the way; to locate the entrance pupil 6Y in the meridional section at a place that is far away from the center axis 1 and has no interference with other rays as contemplated here, however, it is necessary to bring the principal point positions of the two reflecting surfaces 11, 12 providing main power as close to the object side as possible. To this end, preference is given to the so-called +− combined telephoto type capable of bringing the principal points in front. This enables the entrance pupil 6Y to be spaced far away from the center axis 1 and, at the same time, the aperture 5 to be located relatively near the front unit 10.

More preferably, the second reflecting surface 12 has negative power at an area that receives the chief ray $2_0$ in both the meridional and the sagittal section.

For the flare stop, a zonal slit that is rotationally symmetric about the center axis 1 should better be located near the outer periphery of the first reflecting surface in general, and just before that in particular.

More preferably, an image formed on the image plane 30 is relayed to (or projected onto) a second image plane via a relay optical system (Example 3), or an image projected via the relay optical system is further projected via the inventive optical system. Especially in a wide-angle arrangement having an angle of view of greater than 30° in the vertical direction, the annular image transformed at the front unit 10, too, will become a wide-angle-of-view image. This is necessary to make sure the effective area of the front unit 10. For this reason, the rear unit 20 must be configured in the form of a wide-angle optical system having a stop at the front, rendering it difficult to make sure a back focus.

When implementing high-resolution projection or image pickup, on the other hand, an arrangement of the 3-chip type capable of separating light rays into the three primary colors R, G and B is generally used, and so a color synthesis prism or a color separation prism is needed. With the inventive arrangement, however, it is impossible to take a back focus for putting away such prism optical systems.

Preferably in this case, the image is once relayed using the relay optical system and, at the same time, there is a space ensured for putting away the color synthesis prism or color separation prism. Any desired choice of the magnification of the relay optical system contributes to an increase in the flexibility in the size of the front unit 10.

It is then more preferable to satisfy the following condition (1):

$$5 < F_b/h_0 \tag{1}$$

where $F_b$ is the back focus of the relay optical system, and
$h_0$ is the maximum height of the image relayed by the relay optical system.

As the lower limit of 5 to condition (1) is not reached, it renders it impossible to take any space for putting away the color synthesis prism or color separation prism.

It is also more preferable to satisfy the following condition (2):

$$10° < |\tan^{-1}(h/f_r)| \tag{2}$$

where $f_r$ is the focal length of the rear unit 20, and
h is the maximum height of the annular image formed by the front unit 10.

Condition (2) is concerned with the angle of view of the rear unit 20: the wider the taking angle of view, the wider the angle of view of the annular image transformed by the front unit 10 grows. For this reason, it is required to make the angle of view of the rear unit 20 wide: as the lower limit of 10° to condition (2) is not reached, it will render it impossible to make the taking angle of view wide.

By the way, the inventive optical system is characterized in that the entrance pupil 6Y in the section (meridional section) including the center axis 1 is being projected near the first reflecting surface 11, enabling the flare stop for prevention of flares or the like to be effectively located. It is thus possible to make small the entrance area of the optical system in the section including the center axis 1, thereby effectively preventing unessential light from entering the front unit 10 or achieving drastic flare prevention. To reduce the size of the optical system while getting hold of a wide taking angle of view, it is also required that the stop-forming round aperture 5 be positioned near to the front unit 10. To this end it is of importance to satisfy the following condition (3):

$$0.1 < |A/B| < 5 \tag{3}$$

where A is a distance from the entrance pupil 6Y position to the center axis 1, as measured in the section including the center axis 1,
B is a distance from the entrance pupil 6Y to the aperture 5, as measured along the center axis 1, and
|A/B| is a ratio between those distances.
As the lower limit of 0.1 to condition (3) is not reached, it makes flare light likely to enter the optical system, because the entrance pupil 6Y draws too near to the center axis 1. As the upper limit of 5 is exceeded, the distance between the aperture 5 and the front unit 10 grows too long, resulting in the inability to take a wide taking angle of view, because light rays exiting the front unit 10 are intercepted at the first reflecting surface 11.

More preferably, $$0.2 < |A/B| < 2 \tag{3-1}$$

Set out are the values of conditions (1), (2) and (3) in Examples 1, 2 and 3 given later.

|  | Example 1 | Example 2 | Example 3 |
|---|---|---|---|
| $F_b/h_0$ | — | — | 8.58 |
| $|\tan^{-1}(h/f_r)|$ | 25.40 | 16.71 | — |
| A | 16.06 | 13.89 | — |
| B | 19.20 | 22.43 | — |
| $|A/B|$ | 0.84 | 0.62 | — |

The optical system of the invention is now explained more specifically with reference to Examples 1, 2 and 3. Although will be enumerated later, the constructional parameters in these examples have been determined on the results of normal ray tracing from the object plane to the image plane 30 via the front unit 10 and the rear unit 20, as shown typically in FIG. 1.

For a coordinate system, assume that, in normal ray tracing as shown typically in FIG. 1, the origin of a decentered optical surface in a decentered optical system is defined by a position of projection of an entrance pupil 6Y onto the rotationally symmetric axis (center axis) 1, the Y-axis positive direction by a direction from the rotationally symmetric axis (center axis) 1 away from the image plane 30, and the Y-Z plane is defined by the paper plane of FIG. 1. Further, the Z-axis positive direction is defined by a direction opposite to the entrance pupil 6Y now assumed to lie in the paper plane of FIG. 1, and the X-axis positive direction by an axis that forms with the Y- and Z-axes a right-handed orthogonal coordinate system.

For a decentered surface are the amount of decentration of that surface from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$(°)) of the coordinate systems for defining the surfaces with the centers on the X-, Y- and Z-axes, respectively. In that case, the positive for $\alpha$ and $\beta$ mean counterclockwise rotation with respect to the positive directions of the respective axes, and the positive for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first a-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a co-axial optical system, there is a surface spacing given. Besides, the radius of curvature of each surface and the refractive index and Abbe constant of the medium are given as usual.

It is noted that the term with respect to aspheric surfaces on which no data are mentioned in the constructional parameters, given later, is zero. Refractive indices and Abbe constants are given on a d-line (587.56 nm wavelength) basis, and length in mm. The decentration of each surface is given in terms of the amount of decentration from the position of projection of the entrance pupil 6Y onto the axis 1 of rotational symmetry (center axis).

It is noted that the aspheric surface is a rotationally symmetric aspheric surface given by the following defining formula.

$$Z=(Y^2/R)/[1+\{1-(1+k)Y^2/R^2\}^{1/2}]+aY^4+bY^6+cY^8+dY^{10}+\ldots \quad (a)$$

where Z is the optical axis with the proviso that Y is taken in a direction vertical to the optical axis, R is a paraxial radius of curvature, K is a conical constant, and a, b, c, d, . . . are the fourth-, the sixth-, the eighth-, the tenth-order aspheric coefficients. The Z-axis in this defining formula becomes the axis of the rotationally symmetric aspheric surface.

In this conjunction, an extended rotation free-form surface is a rotationally symmetric surface given by the following definition.

First, the following curve (b) passing through the origin on the Y-Z coordinate plane is determined.

$$Z=(Y^2/RY)/[1+\{1-(C_1+1)Y^2/RY^2\}^{1/2}]C_2Y+C_3Y^2+C_4Y^3+C_5Y^4+C_6Y^5+C_7Y^6+\ldots C_{21}Y^{20}+\ldots C_{n+1}Y^n \quad (b)$$

Then, a curve F(Y) is determined by rotation through an angle θ(°) of that curve (b) in the X-axis position direction provided that the counterclockwise direction is taken as positive. This curve F(Y), too, passes through the origin on the Y-Z coordinate plane.

The extended rotation free-form surface is defined by a rotationally symmetric surface obtained by parallel translation of that curve F(Y) by a distance R in the Z-positive direction (in the Z-negative direction when R is negative), and then rotation of the parallel translated curve about the Y-axis.

As a result, the extended rotation free-form surface becomes a free-form surface (free-form curve) in the Y-Z plane, and a circle with a radius |R| in the X-Z plane.

From this definition, the Y-axis becomes the axis of the extended rotation free-form surface.

Here, RY is the radius of curvature of the spherical term in the Y-Z section, $C_1$ is a conical constant, and $C_2$, $C_3$, $C_4$, $C_5$, etc. are the aspheric coefficients of first, second, third, and fourth order, respectively.

In the optical system of the invention, it is preferable that at least one reflecting surfaces in the front unit 10 is composed of such an extended rotation free-form surface, and when expressed by a polynomial in the Y-Z section, it is of rotationally symmetric shape formed by the rotation about the center axis 1 of a line segment of any shape having at least an odd-number order term with no symmetric plane. By allowing at least one reflecting surface to have such a surface shape, it is possible to provide an optical system of improved resolving power, wherein decentration aberrations unavoidably associated with a reflecting optical system are corrected, and to reduce the size of that optical system.

Example 1

FIG. 1 is a sectional view of the optical system of Example 1, as taken along a center axis 1 (axis of rotational symmetry), and FIG. 2 is a plan view of an optical path through that optical system. Note here that FIG. 2 shows an optical path coming from the azimuth direction of 0° plus an optical path coming from an azimuth direction of ±10°.

The optical system of this example is made up of a front unit 10 rotationally symmetric about the center axis 1, a rear unit 20 rotationally symmetric about the center axis 1, and an aperture 5 located between the front unit 10 and the rear unit 20 coaxially with the center axis 1. A light beam 2 coming from a far away object passes through the front unit 10 and the rear unit 20 in order, forming an image at a position of an image plane 30 that is vertical to and off the center axis 1. When the center axis is set vertically, an annular image which has typically a full-360° (full-panoramic) angle of view, and whose zenithal direction lies in the center direction of the image and whose horizon lies outside, is formed on the image plane 30.

The front unit 10 is made up of a first reflecting surface 11 and a second reflecting surface 12, each of shape rotationally symmetric about the center axis 1. The rear unit 20 is made up of a lens system that includes 4 lenses L1 to L5 in a three-group form and has positive power.

The front unit 10 is made up of the first reflecting surface 11 and the second reflecting surface 12. The first reflecting surface 11 is positioned opposite to an object side, the second reflecting surface 12 is positioned on the same side as the first reflecting surface 11 with respect to the center axis 1, and the first reflecting surface 11 is located on an image plane 30 side with respect to the second reflecting surface 12.

And, a light beam 2 coming from afar enters between the first reflecting surface 11 and the second reflecting surface 12 via an entrance pupil 6Y in the meridional section between the outer periphery of the first reflecting surface 11 and the outer periphery of the second reflecting surface 12. Then, it is reflected at the first reflecting surface 11 located opposite to the entrance pupil 6Y with the center axis 1 interposed between them, traveling away from the image plane 30. Then, the reflected light is reflected at the second reflecting surface 12 located on the same side as the first reflecting surface 11 with respect to the center axis 1, going toward the image plane 30 side. The reflected light passes through a stop-forming round aperture 5 located near a center hole 15 in the first reflecting surface 11 and between the front unit 10 and the rear unit 20 coaxially with the center axis 1, and then through the rear unit 20 of positive power, arriving at the image plane 30 where it is imaged at a radially given position off the center axis 1. The first 11, and the second reflecting surface 12 in the front unit 10 is formed of an extended rotation free-form surface, but the conic constant is zero.

The lens system forming the rear unit 20 is made up of, in order from the front unit 10 side, a double-convex positive lens L1, a cemented lens of a double-convex positive lens L2 and a double-concave negative lens L3, and a cemented lens of a double-convex positive lens L4 and a negative meniscus lens L5 concave on the front unit 10 side.

When the center axis 1 lies in the vertical direction and the image plane 30 directs to the zenith, the center light beam 2 coming from afar in a direction at an angle of elevation of 20° is reflected at the first 11 and the second reflecting surface 12 in the front unit 10 in order, passes through the center hole 15 and the aperture 5 and passes through the rear unit 20, arriving at the image plane 30 where it is imaged at a radially given position off the center axis 1.

With the optical system here, the aperture (stop) 5 positioned between the front unit 10 and the rear unit 20 is projected on an object side so that in the meridional section, the entrance pupil 6Y is formed between the outer periphery of the first reflecting surface 11 and the second reflecting surface 12 in the front unit 10, and in the sagittal section, it is formed as an image 6X or an entrance pupil 6X on the center axis (the axis of rotational symmetry) 1.

And in the optical system here, a light beam 2, 3U, 3L (3U is one coming from a far away place in the sky, and 3L is one coming from a far away place on the ground) coming from the afar and through the aperture pupil 6Y is imaged at a position 4Y near the second reflecting surface 12 in the section including the center axis 1 (the meridional section: FIG. 1), and at a position 4X between the first 11 and the second reflecting surface 12 in the section that is orthogonal to the section including the center axis 1 and contains the main ray 20 of that light beam (the sagittal section: FIG. 2).

The specifications of Example 1 are:
Horizontal angle of view: 360°,
Vertical angle of view: 20° (the center angle of view: 20° (the angle of elevation)),
Entrance pupil diameter: 0.92 mm, and
Image size: φ1.89 to φ4.82 mm.

The optical system of Example 1 having the image plane 30 located parallel with the ground is preferably used at an angle of view set up at the sky.

Figure 3:
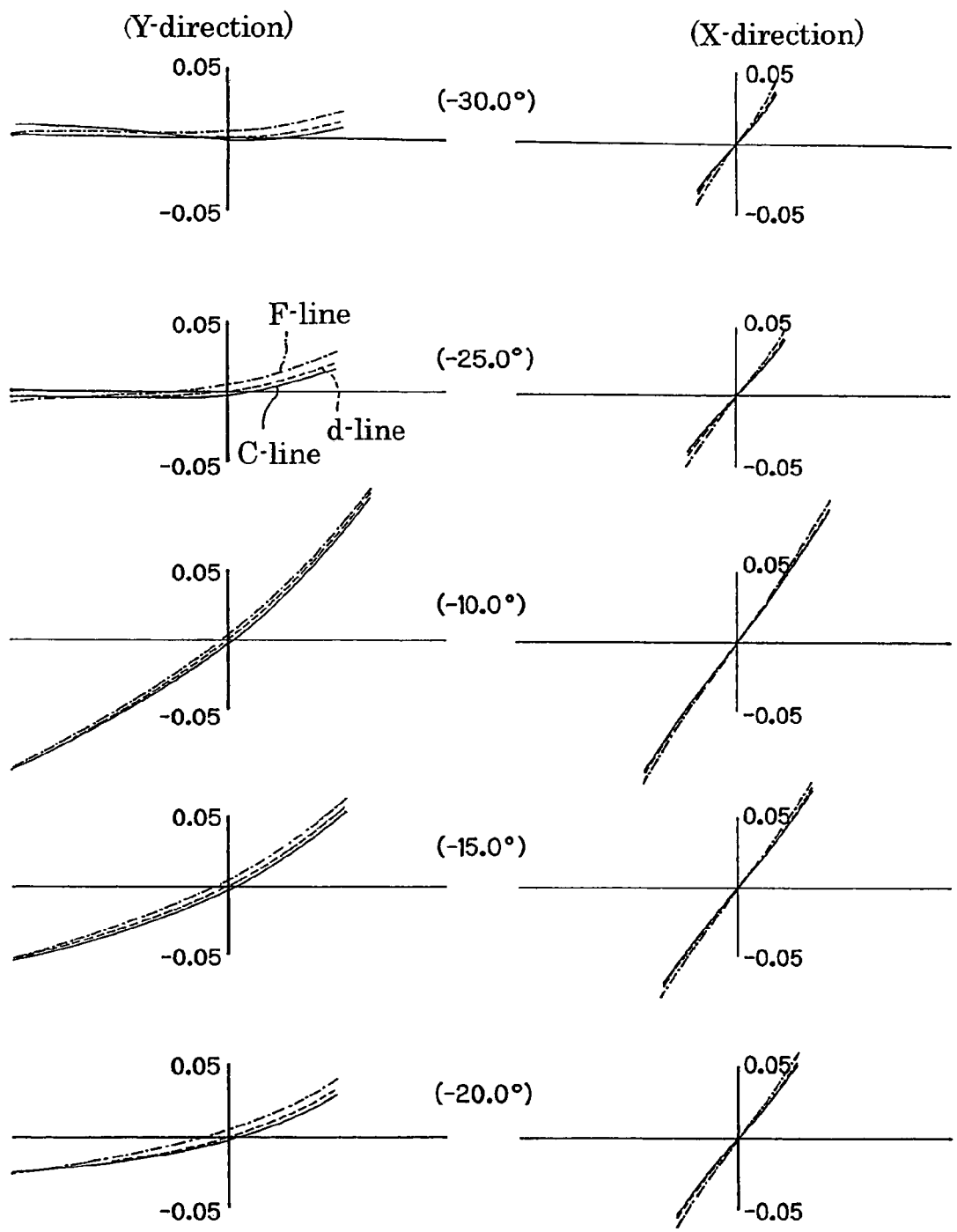
FIG. 3 is a transverse aberration diagram for the whole optical system of Example 1.

FIG. 3 is a transverse diagram for the whole optical system according to Example 1, wherein the bracketed angles at the center stand for vertical angles of view and Y-direction (meridional) and X-direction (sagittal) transverse aberrations at those angles are shown. Throughout the disclosure, the positive angle of view stands for an angle of depression and the negative angle of view stands for an angle of elevation.

Example 2

Figure 4:
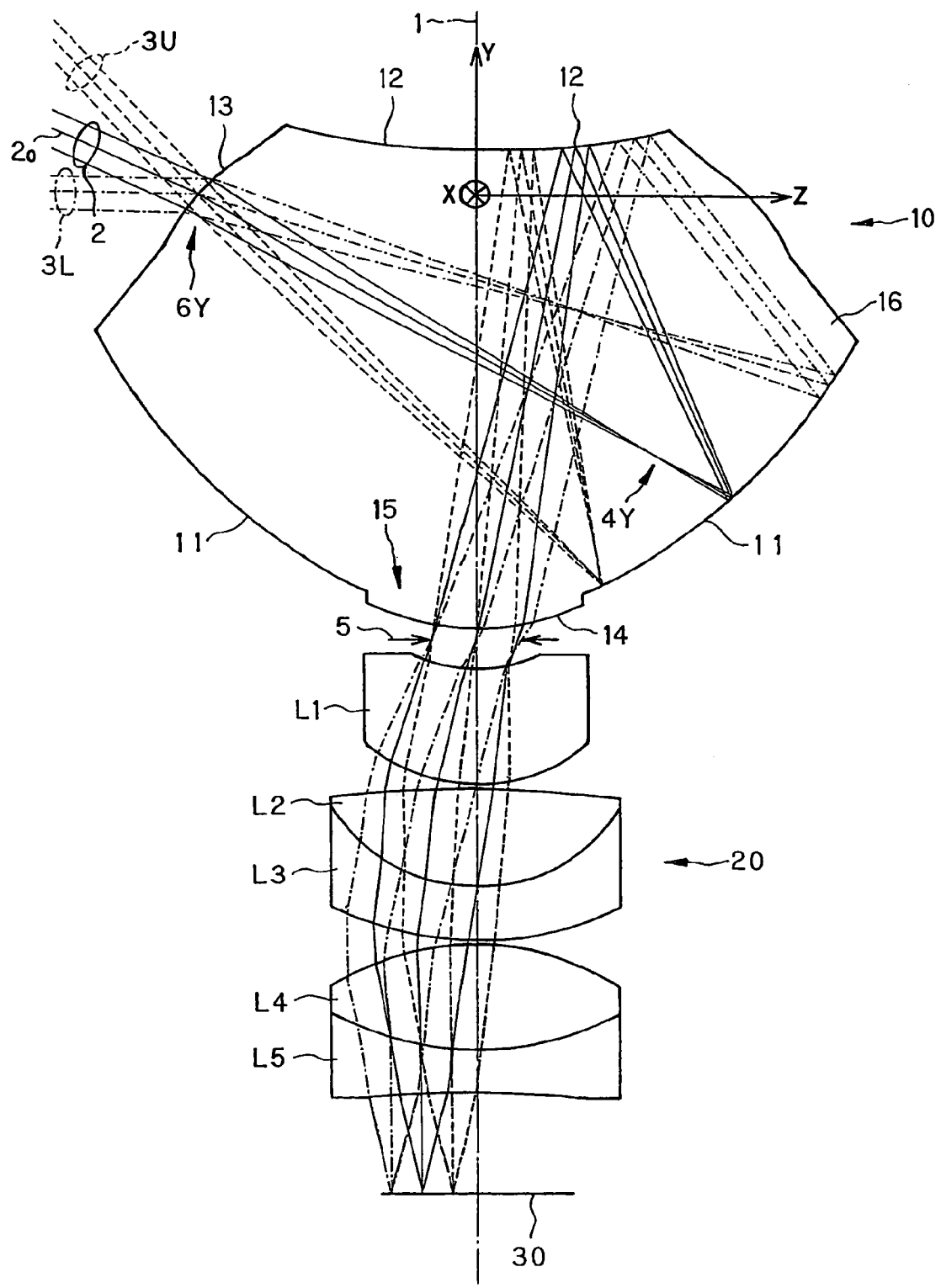
FIG. 4 is a sectional view of the optical system according to Example 2 of the invention, as taken along the center axis.
Figure 5:
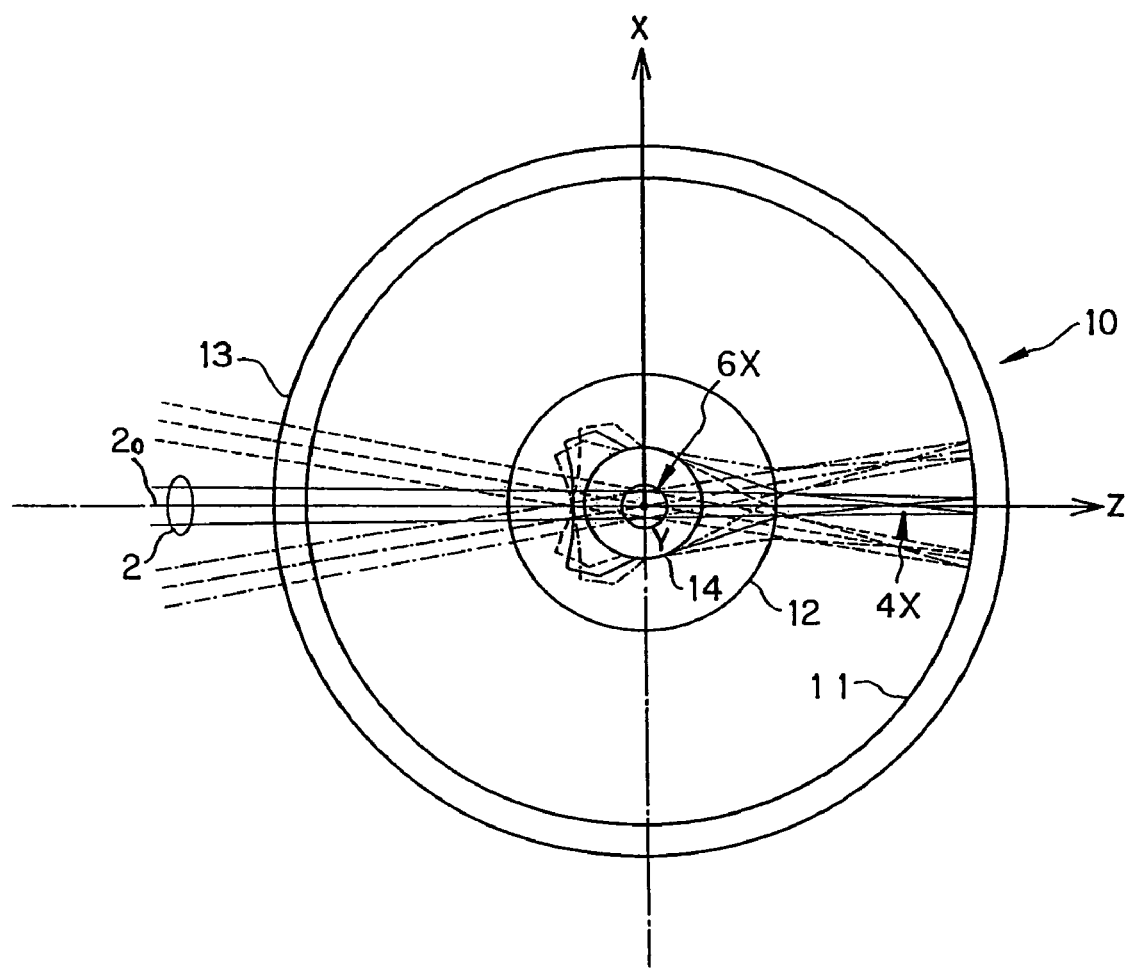
FIG. 5 is a plan view of an optical path through the optical system according to Example 2 of the invention.

FIG. 4 is a sectional view of the optical system of Example 2, as taken along a center axis 1 (the axis of rotational symmetry), and FIG. 5 is a plan view of an optical path through that optical system. Note here that FIG. 5 shows an optical path incident from the azimuth angle direction of 0° plus an optical path incident from an azimuth angle direction of ±10°.

The optical system of this example, wherein a resin or other transparent medium 16 having a refractive index of greater than 1 is filled up between a first 11 and a second reflecting surface 12 in a front unit 10, is made up of the front unit 10 rotationally symmetric about the center axis 1, a rear unit 20 rotationally symmetric about the center axis 1, and an aperture 5 located between the front 10 and the rear unit 20 coaxially with the center axis 1. A light beam 2 coming from a far away object passes through the front unit 10 and the rear unit 20 in order, forming an image at a position of an image plane 30 that is vertical to and off the center axis 1. When the center axis is set vertically, an annular image which has typically a full-360° (full-panoramic) angle of view, and whose zenithal direction lies in the center direction of the image and whose horizon lies outside, is formed on the image plane 30.

The front unit 10 is made up of a first reflecting surface 11 and a second reflecting surface 12, each of shape rotationally symmetric about the center axis 1, plus a first transmitting surface 13 entering the transparent medium 16 and a second transmitting surface 14 exiting the transparent medium 16. The first 13 and the second transmitting surface 14, too, are each of rotationally symmetric shape about the center axis 1. And the first transmitting surface 13 is located on an object side with respect to the center axis 1; the first reflecting surface 11 is located opposite to the first transmitting surface 13 with the center axis 1 interposed between them and on the image plane 30 side with respect to the first transmitting surface 13; the second reflecting surface 12 is located on the same side as the first reflecting surface 11 with respect to the center axis 1 and opposite to the image plane 30 with respect to the second reflecting surface 12; and the second transmitting surface 14 is located near the center hole 15 in the first reflecting surface 11 and on the image plane 30 side with respect to the first transmitting surface 11.

The rear unit 20 is made up of a lens system that includes 5 lenses L1 to L5 in a three-group form and has positive power.

And, a light beam 2 coming from afar enters the transparent medium 16 via the first transmitting surface 13, and is then reflected at the first reflecting surface 11 located opposite to the first transmitting surface 13 with the center axis 1 interposed between them, traveling away from the image plane 30. Then, the reflected light is reflected at the second reflecting surface 12 located on the same side as the first reflecting surface 11 with respect to the center axis 1, traveling to the image plane side, and leaving the transparent medium 16 via the second transmitting surface 14. Then, the reflected light passes the stop-forming round aperture 5 located between the front unit 10 and the rear unit 20 coaxially with the center axis 1 and the rear unit 20 of positive power in order, arriving at the image plane 30 where it is imaged at a radially given position off the center axis 1. The first reflecting surface 11, the second reflecting surface 12 and the first transmitting surface 13 in the front unit 10 are each formed of an extended rotation free-form surface, but the conic constant is zero, and the second transmitting surface 14 is formed of a rotationally symmetric aspheric surface having a vertex on the center axis 1.

The lens system forming the rear unit 20 is made up of, in order from the front unit 10 side, a negative meniscus lens L1 concave on the front unit 10 side, a cemented lens of a double-convex positive lens L2 and a negative meniscus lens L3 convex on the front unit 10 side, and a cemented lens of a double-convex positive lens L4 and a double-concave negative lens L5.

When the center axis 1 lies in the vertical direction and the image plane 30 directs to the zenith, the center light beam 2 coming from afar in a direction at an angle of elevation of 2.5° is refracted through the first transmitting surface 13 that is an entrance surface for the front unit 10, entering the transparent medium 16. The light beam is then reflected at the first 11 and the second reflecting surface 12 in order, and refracted through the second transmitting surface 14, leaving the transparent medium in the front unit 10. Then, it enters the rear unit 20 via the aperture 5, arriving at the image plane 30 where it is imaged at a radially given position off the center axis 1.

With the optical system here, the aperture (stop) 5 positioned between the front unit 10 and the rear unit 20 is projected on an object side so that in the meridional section, the entrance pupil 6Y is formed between the outer periphery of the first reflecting surface 11 and the second reflecting surface 12 in the front unit 10, and in the sagittal section, it is formed as an image 6X or an entrance pupil 6X on the center axis (the axis of rotational symmetry) 1.

And in the optical system here, a light beam 2, 3U, 3L (3U is one coming from a far away place in the sky, and 3L is one coming from a far away place on the ground) coming from afar and through the entrance pupil 6Y is imaged at a position 4Y near the second reflecting surface 12 in the section including the center axis 1 (the meridional section: FIG. 1), and at a position 4X between the first 11 and the second reflecting surface 12 in the section that is orthogonal to the section including the center axis 1 and contains the main ray 20 of that light beam (the sagittal section: FIG. 2).

The specifications of Example 2 are:
Horizontal angle of view: 360°,
Vertical angle of view: 45° (the center angle of view: 22.5° (the angle of elevation),
Entrance pupil diameter: 1.68 mm, and
Image size: φ2.42 to φ5.43 mm.

In the optical system of Example 2, the first reflecting surface 11 is located on the image plane 30 side with respect to the first transmitting surface 13, the second reflecting surface 12 is located opposite to the image plane 30 with respect to the first reflecting surface 11, and the second transmitting surface 14 is located on the image plane 30 side with respect to the first transmitting surface 13.

The optical system of Example 1 having the image plane 30 located parallel with the ground is preferably used at an angle of view set up at the sky.

Figure 6:
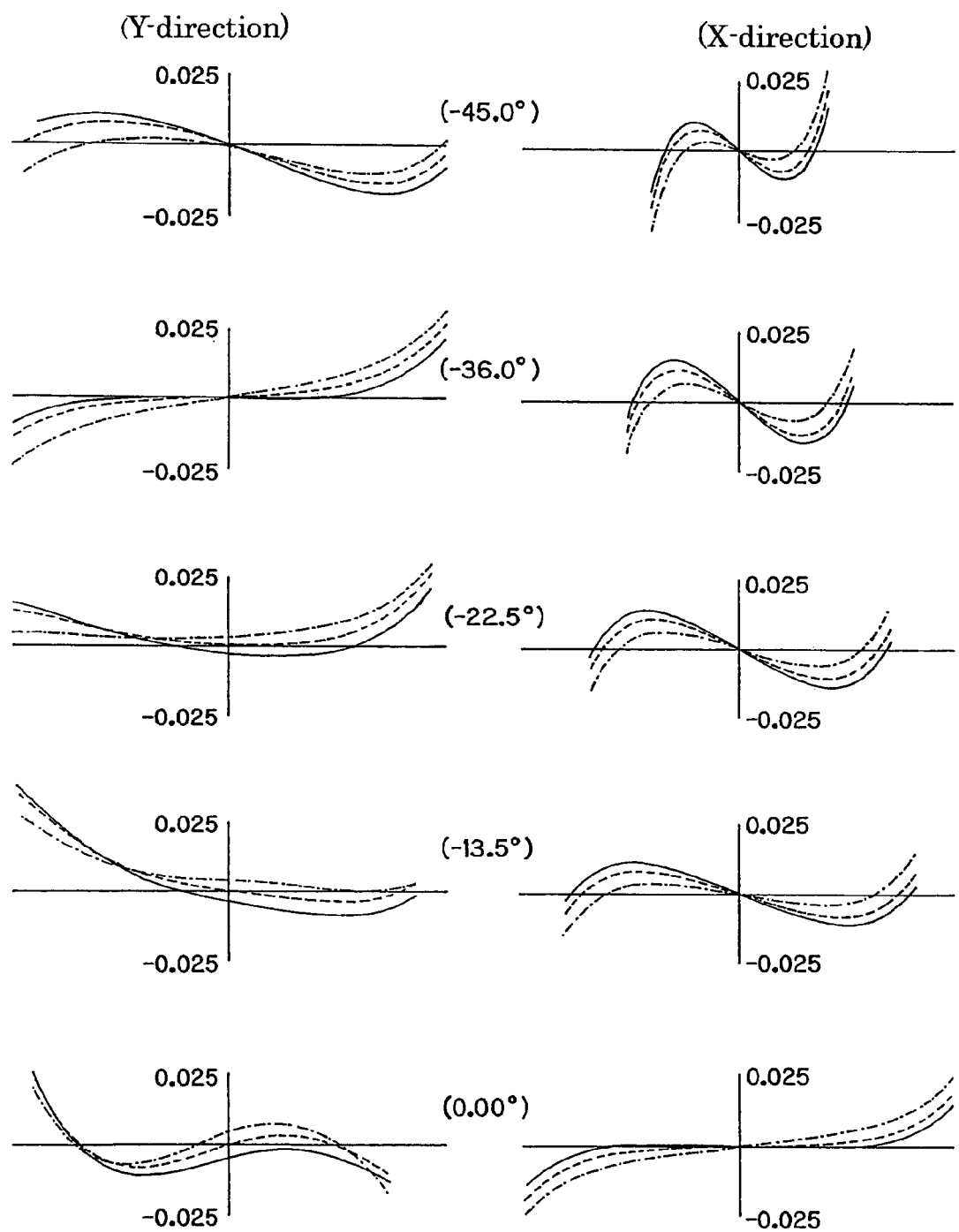
FIG. 6 is a transverse aberration diagram for the whole optical system of Example 2.

FIG. 6 is a transverse aberration diagram for the whole optical system of the example here.

Example 3

Figure 7:
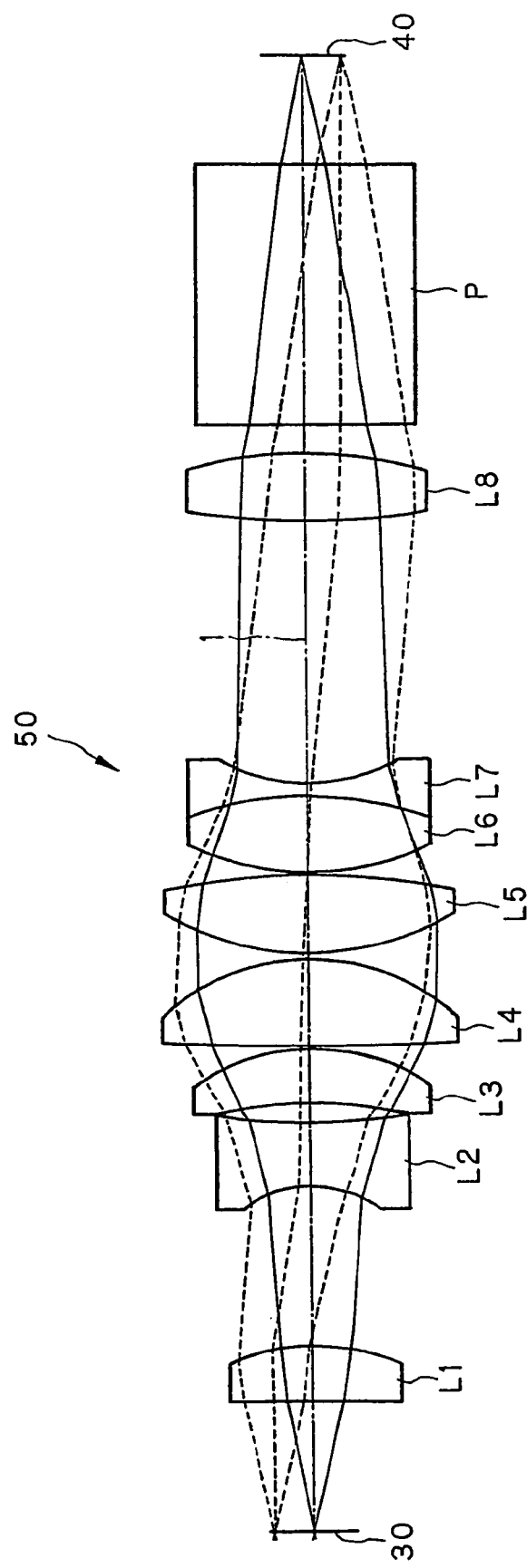
FIG. 7 is a sectional view of the relay optical system according to Example 3 of the invention, as taken along the center axis.
Figure 8:
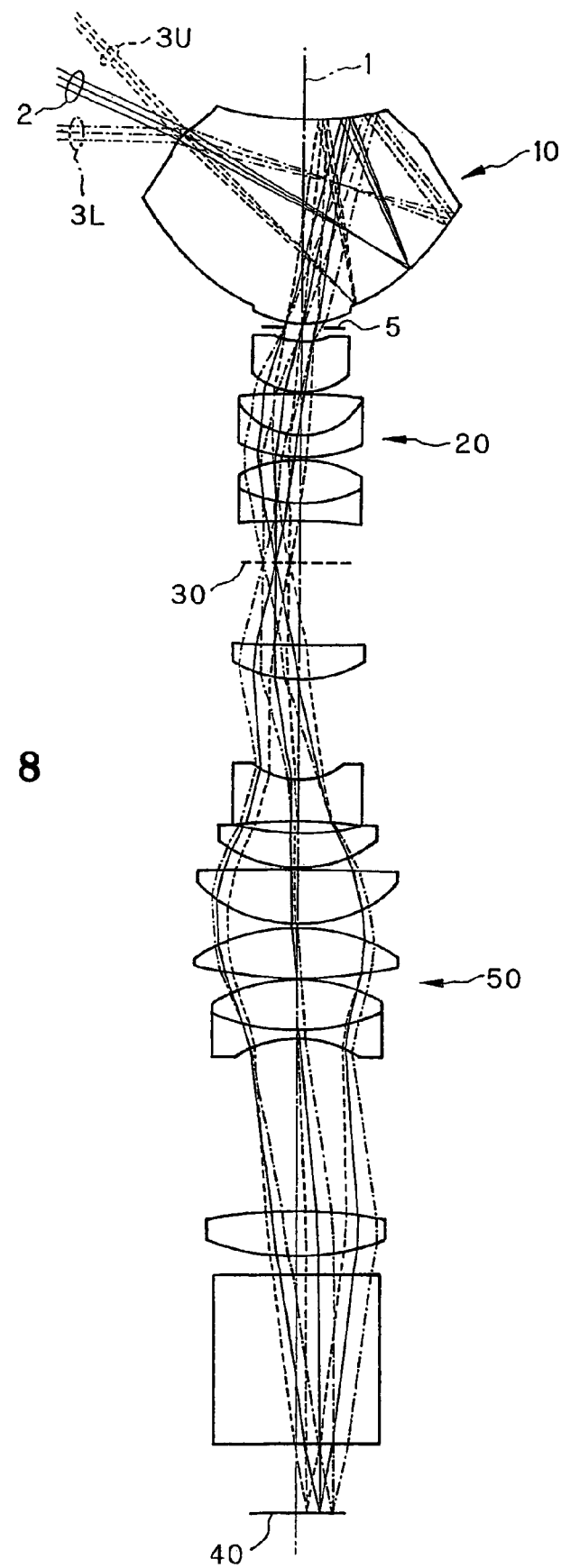
FIG. 8 is a sectional view of an arrangement having the relay optical system of Example 3 connected to the image plane side of the optical system of Example 2, as taken along the center axis.

FIG. 7 is a sectional view of the relay optical system according to Example 3, as taken along a center axis 1, and FIG. 8 is a sectional view of the relay optical system of this example connected to the image plane 30 side of the optical system according to Example 2.

This example is directed to a relay optical system 50 for relaying to a second image plane 40 an annular image formed at the image plane 30 of the optical systems according to Examples 1 and 2 of the invention. As noted above, the relay optical system 50 here connected to the image plane 30 side of the optical system according to Example 2 is shown in section in FIG. 8. The relay optical system 50 here is made up of 8 lenses in a seven-group form: in order from the image plane 30 side, a positive meniscus lens L1 concave on its object side, a double-concave negative lens L2, a positive meniscus lens L3 concave on its object side, a double-convex positive lens L4, a double-convex positive lens L5, a cemented lens of a double-convex positive lens L6 and a double-concave negative lens L7, and a double-convex positive lens L8. Between the double-convex positive lens L8 and the second image plane 40 (a back focus), there is color separation prism P (a color synthesis prism in the case of a projection optical system) located.

The specifications of Example 3 are:
Magnification: 1.0
Focal length: 145.34 mm
Entrance side NA: 0.22
Object height: φ6.00 mm, and
Image size: φ6.00 mm.

Figure 9:
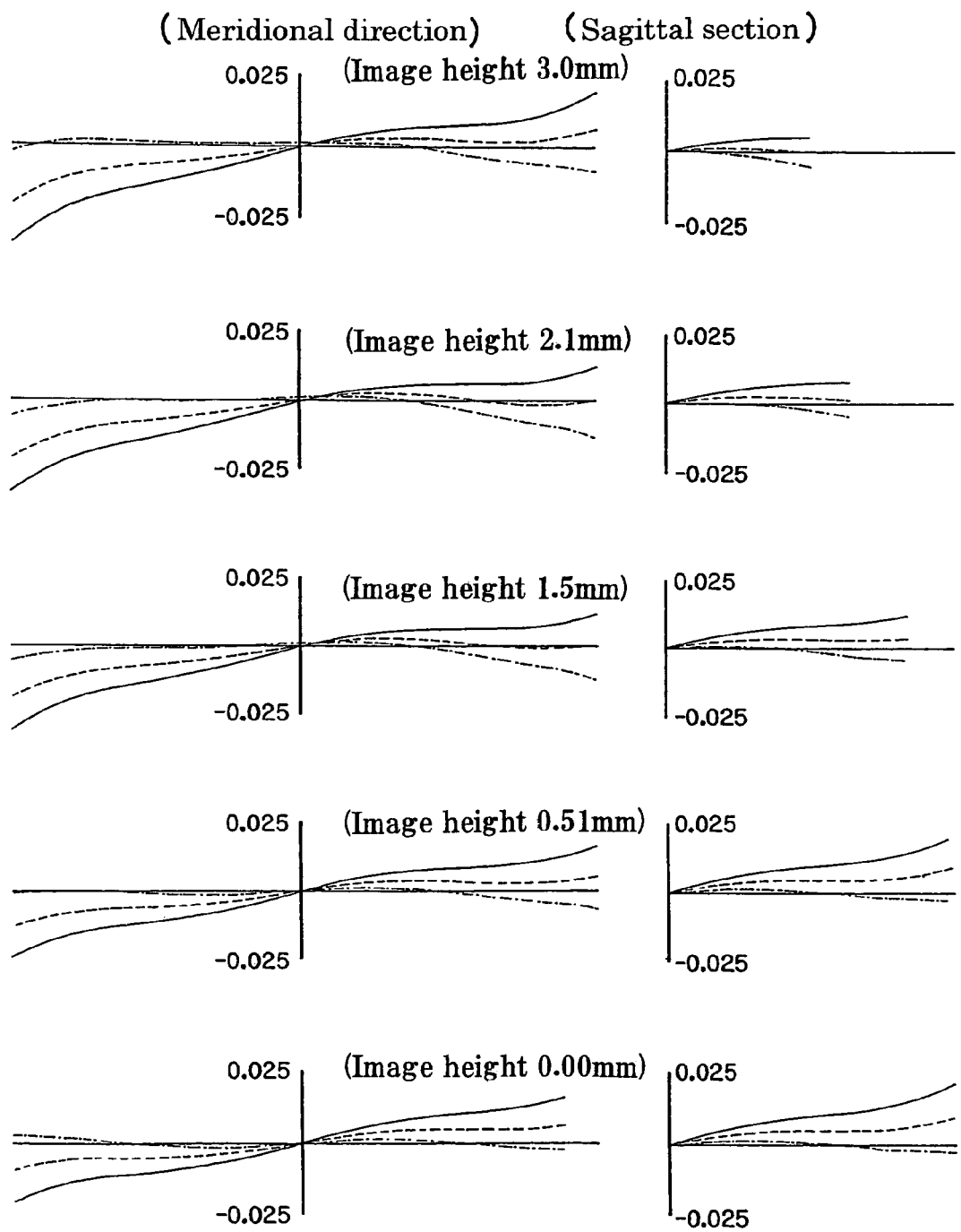
FIG. 9 is a transverse aberration diagram for the relay optical system according to Example 3.
Figure 10:
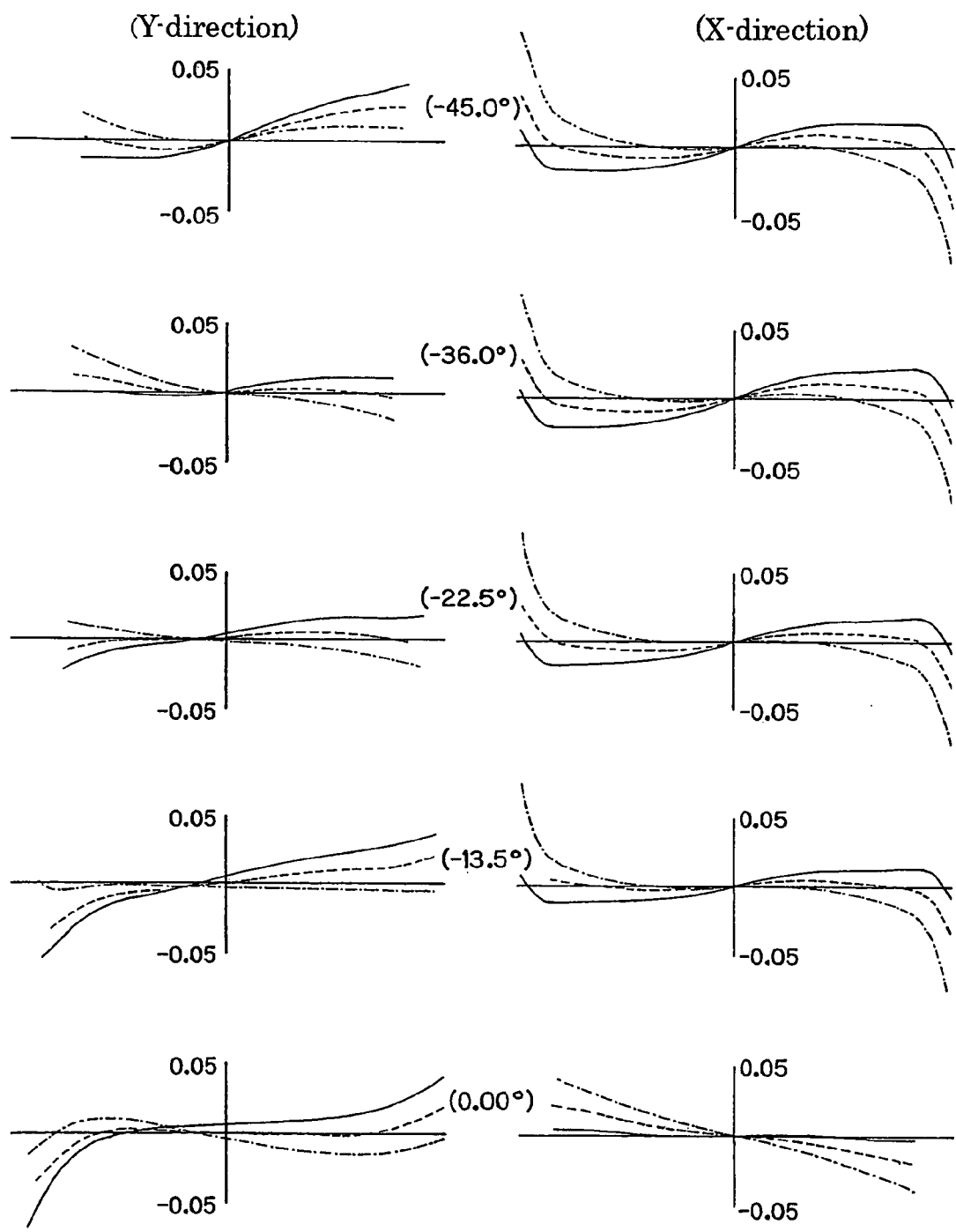
FIG. 10 is a transverse aberration diagram for the whole optical system of FIG. 8.

FIG. 9 is a transverse aberration diagram for the relay optical system 50 according to this example, and FIG. 10 is a transverse aberration diagram for the whole arrangement wherein the relay optical system 50 of this example is connected to the image plane 30 side of the optical system according to Example 2.

The constructional parameters in Examples 1, 2 and 3 are set out below, wherein the acronyms "ASS", "ERFS", and "RE" indicate an aspheric surface, an extended rotation freeform surface, and a reflecting surface, respectively.

Example 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | (1) | | |
| 2 | ERFS[1] (RE) | | (2) | | |
| 3 | ERFS[2] (RE) | | (3) | | |
| 4 | ∞ (Stop) | | (4) | | |
| 5 | 7.56 | 2.50 | | 1.7118 | 47.6 |
| 6 | −23.20 | 0.10 | | | |
| 7 | 7.66 | 2.50 | | 1.6375 | 57.1 |
| 8 | −4.86 | 1.00 | | 1.6610 | 32.7 |
| 9 | 8.16 | 0.10 | | | |
| 10 | 5.45 | 3.00 | | 1.5908 | 61.9 |
| 11 | −3.50 | 1.00 | | 1.6378 | 34.6 |
| 12 | −23.24 | 1.00 | | | |
| Image plane | ∞ | | | | |

ERFS[1]

| | |
|---|---|
| RY | −206.37 |
| θ | −40.44 |
| R | 11.53 |
| $C_3$ | $-1.3868 \times 10^{-2}$ |
| $C_4$ | $8.7260 \times 10^{-5}$ |
| $C_5$ | $-2.8698 \times 10^{-6}$ |

ERFS[2]

| | |
|---|---|
| RY | −31.77 |
| θ | −85.06 |
| R | 5.20 |
| $C_3$ | $1.4294 \times 10^{-2}$ |
| $C_4$ | $4.7975 \times 10^{-4}$ |
| $C_5$ | $-2.4349 \times 10^{-5}$ |

Displacement and tilt(1)

| X | 0.00 | Y | 0.00 | Z | −16.05 |
|---|---|---|---|---|---|
| α | 0.00 | β | 0.00 | γ | 0.00 |

Displacement and tilt(2)

| X | 0.00 | Y | −10.04 | Z | 0.00 |
|---|---|---|---|---|---|
| α | 0.00 | β | 0.00 | γ | 0.00 |

Displacement and tilt(3)

| X | 0.00 | Y | 1.33 | Z | 0.00 |
|---|---|---|---|---|---|
| α | 0.00 | β | 0.00 | γ | 0.00 |

Displacement and tilt(4)

| X | 0.00 | Y | −14.70 | Z | 0.00 |
|---|---|---|---|---|---|
| α | −90.00 | β | 0.00 | γ | 0.00 |

Example 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | (1) | | |
| 2 | ERFS[1] | | (2) | 1.5247 | 56.2 |
| 3 | ERFS[2] (RE) | | (3) | 1.5247 | 56.2 |
| 4 | ERFS[3] (RE) | | (4) | 1.5247 | 56.2 |
| 5 | ASS[1] | | (5) | | |
| 6 | ∞ (絞り) | 1.52 | (6) | | |
| 7 | −6.88 | 6.02 | | 1.6385 | 55.4 |
| 8 | −8.12 | 0.20 | | | |
| 9 | 55.87 | 5.03 | | 1.6230 | 58.1 |
| 10 | −8.26 | 2.83 | | 1.7552 | 27.5 |
| 11 | −15.70 | 0.20 | | | |
| 12 | 12.96 | 5.31 | | 1.6230 | 58.1 |
| 13 | −15.13 | 2.23 | | 1.7552 | 27.5 |
| 14 | 57.95 | 5.00 | | | |
| Image plane | ∞ | | | | |

ERFS[1]

| | |
|---|---|
| RY | 10.08 |
| θ | −42.51 |
| R | −13.87 |
| $C_4$ | $1.1608 \times 10^{-3}$ |

-continued

Example 2

ERFS[2]

| | |
|---|---|
| RY | −329.47 |
| θ | −33.76 |
| R | 17.72 |
| $C_3$ | $-1.5624 \times 10^{-2}$ |
| $C_4$ | $-1.4271 \times 10^{-4}$ |
| $C_5$ | $-8.5582 \times 10^{-6}$ |

ERFS[3]

| | |
|---|---|
| RY | −10.84 |
| θ | −79.00 |
| R | 7.82 |
| $C_3$ | $2.9495 \times 10^{-2}$ |
| $C_4$ | $-5.4904 \times 10^{-4}$ |
| $C_5$ | $1.1399 \times 10^{-4}$ |

ASS[1]

| | |
|---|---|
| R | −9.41 |
| k | 0.0000 |
| a | $4.5893 \times 10^{-4}$ |

Displacement and tilt(1)

| X | 0.00 | Y | 0.00 | Z | −13.89 |
|---|---|---|---|---|---|
| α | 0.00 | β | 0.00 | γ | 0.00 |

Displacement and tilt(2)

| X | 0.00 | Y | 0.00 | Z | 0.00 |
|---|---|---|---|---|---|
| α | 0.00 | β | 0.00 | γ | 0.00 |

Displacement and tilt(3)

| X | 0.00 | Y | −9.20 | Z | 0.00 |
|---|---|---|---|---|---|
| α | 0.00 | β | 0.00 | γ | 0.00 |

Displacement and tilt(4)

| X | 0.00 | Y | 3.15 | Z | 0.00 |
|---|---|---|---|---|---|
| α | 0.00 | β | 0.00 | γ | 0.00 |

Displacement and tilt(5)

| X | 0.00 | Y | −21.83 | Z | 0.00 |
|---|---|---|---|---|---|
| α | −90.00 | β | 0.00 | γ | 0.00 |

Displacement and tilt(6)

| X | 0.00 | Y | −22.43 | Z | 0.00 |
|---|---|---|---|---|---|
| α | −90.00 | β | 0.00 | γ | 0.00 |

Example 3

| Surface No. | Radius of curvature | Surface separation | Displacement and tilt | Refractive index | Abbe's No. |
|---|---|---|---|---|---|
| Object plane | ∞ | 9.98 | | | |
| 1 | −226.44 | 4.28 | | 1.8061 | 40.9 |
| 2 | −14.90 | 12.39 | | | |
| 3 | −7.82 | 5.00 | | 1.8061 | 40.9 |
| 4 | 43.70 | 1.73 | | | |
| 5 | −26.37 | 4.18 | | 1.5691 | 71.3 |
| 6 | −14.28 | 0.20 | | | |
| 7 | 291.23 | 7.00 | | 1.5691 | 71.3 |
| 8 | −15.60 | 0.40 | | | |
| 9 | 20.70 | 6.26 | | 1.4970 | 81.5 |
| 10 | −50.27 | 0.20 | | | |
| 11 | 19.79 | 6.13 | | 1.4875 | 70.2 |
| 12 | −24.16 | 1.00 | | 1.8061 | 40.9 |
| 13 | 12.84 | 20.83 | | | |
| 14 | 54.77 | 5.40 | | 1.6910 | 54.8 |
| 15 | −30.58 | 2.00 | | | |
| 16 | ∞ | 20.00 | | 1.5163 | 64.1 |
| 17 | ∞ | 8.08 | | | |
| Image plane | ∞ | | | | |

Further, in the above-exemplified optical systems, it is possible to make the angle of view wider in a sectional direction including the axis 1 of rotational symmetry, if a Y-toric lens is added to the front unit 10 further on the object side. It is here noted that the Y-toric lens should be configured of a surface rotationally symmetric with respect to the Y-axis (the center axis 1) while it has no power in the X-direction but yet has negative power in the Y-direction (the section of FIG. 1 or the like). More preferably, that toric lens should be configured into a negative meniscus lens shape that is convex on the object side in the Y-Z section, thereby minimizing image distortion and making better correction of aberrations.

Furthermore, if the front unit 10 is provided on its object side with not only one Y-toric lens of negative meniscus shape in section, but also two or three lenses of meniscus shape, it is then possible to reduce image distortion as much as possible. If an additional reflecting surface or prism rotationally symmetric with respect to the center axis 1 instead of a lens is provided, it is then easy to observe or pick up images in any direction by reflection and refraction of light rays.

In the foregoing examples, each reflecting surface, and each refracting surface in the front unit 10 is constructed of an extended rotation free-form surface that is formed by rotation of a line segment of any shape about the axis 1 of rotational and has no vertex on the axis 1 of rotational symmetry; however, it is easy to replace them by any desired curved surfaces.

The optical system of the invention also makes correction of an image plane tilt occurring by decentration and pupil aberrations of the stop upon back projection by making use of the formula that defines a line segment of any shape with an odd-number order term incorporated in it.

By immediate use of the transparent medium that forms the front unit 10 according to the invention and is rotationally symmetric about the center axis 1, images having a full 360°-direction angle of view may be taken or projected. However, it is acceptable to cut that transparent medium along a section including the center axis 1 into ½, ⅓, ⅔, etc. for the purpose of taking or projecting an image having an angle of view of 180°, 120°, 240°, etc.

It is noted that when, as in Example 1, the front unit 10 in the optical system of the invention is made up of only two reflecting surfaces 11 and 12, such front unit 10 as shown in FIG. 12(a) may easily be set up by forming the first 11 and second reflecting surface 12 on the upper ends of the associated cylinders 11' and 12' having the same diameter in a coaxial fashion, vertically flipping one cylinder 11' such that the first 11 is right opposite to the second reflecting surface 12, inserting the cylinders 11' and 12' into a transparent cylinder 19 having an inner diameter the same as the outer diameter of the cylinders 11', 12' from both ends, and fixing the cylinders 11' and 12' to the cylinder 19 such that there is a given spacing held.

While the optical system of the invention has been described with reference to an imaging or viewing optical system for obtaining an image having a full 360°-direction angle of view (a full-panoramic image) including the zenith with the center axis 1 (axis of rotational symmetry) lying in the vertical direction, it is understood that the invention is not only for taking optical systems, but equally applicable to a projection optical system in which the optical path is the other way around to project an image at a full 360° (panoramic)-direction angle of view. An endoscope could be used as a full-panoramic viewing optical system for in-tract viewing apparatus.

Figure 13A:
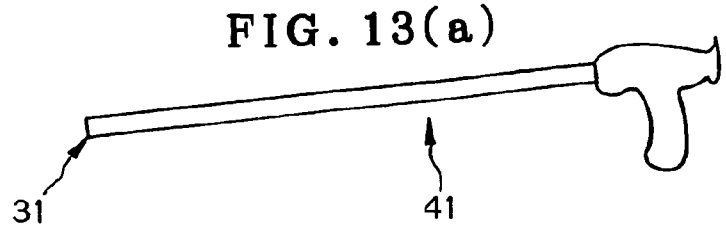
FIGS. 13(a), 13(b) and 13(c) are illustrative of an example of using the panoramic taking optical system of the invention as a taking optical system at the endmost portion of an endoscope.
Figure 13B:
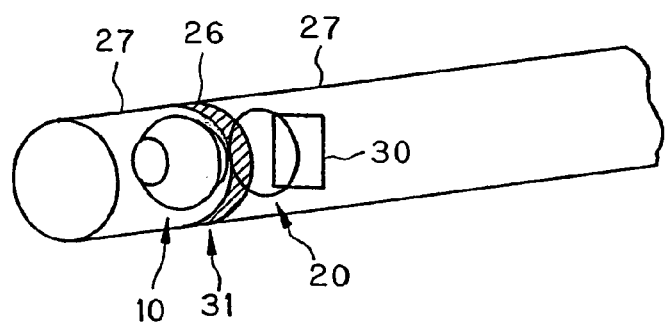
Figure 13C:
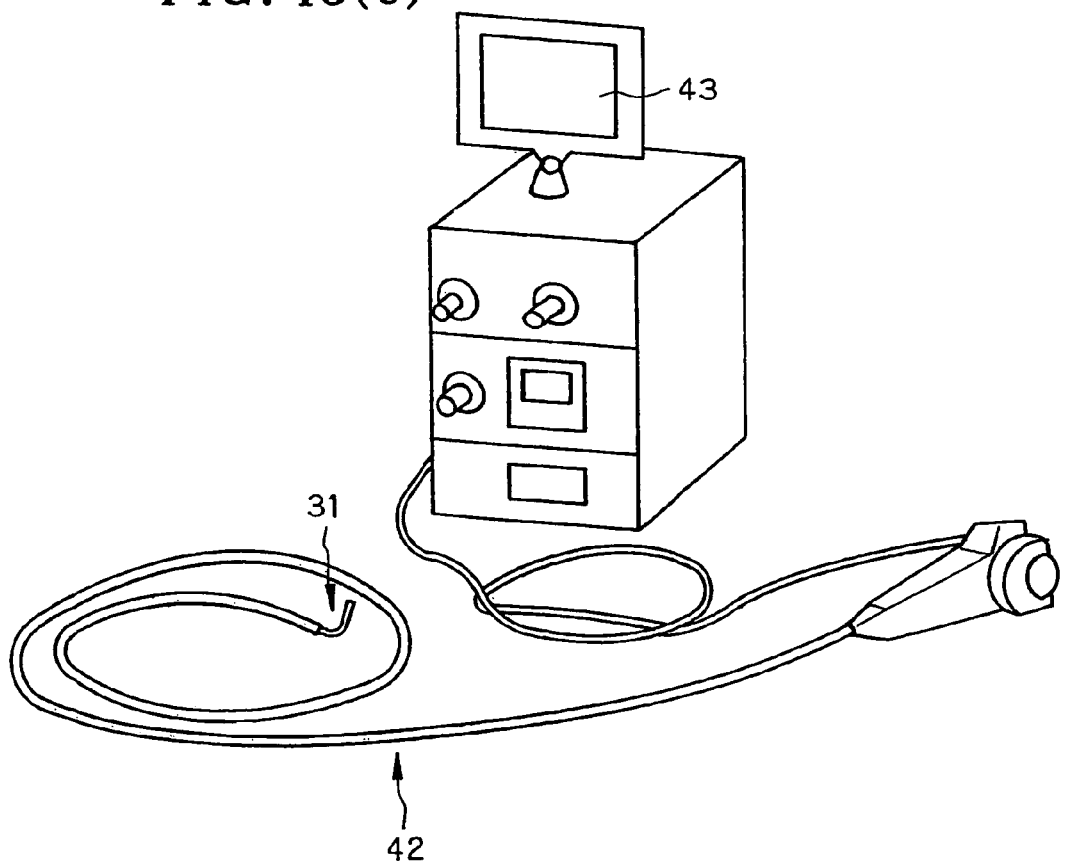

How to use a panoramic taking optical system 31 or panoramic projection optical system 32 is now explained as a typical example of application of the optical system of the invention. FIG. 13 is generally illustrative of an example of the panoramic taking optical system 31 of the invention used as taking optical system attached to the endmost portion as a taking optical system of an endoscope. More specifically, FIG. 13(a) is illustrative of the panoramic taking optical system 31 of the invention that is attached to the endmost portion of a hard endoscope 41 to take and view a full 360°-direction image, and FIG. 13(b) is illustrative in schematic of the endmost construction of that. In the panoramic taking optical system 31 of the invention, a flare stop 27 defined by a casing having a diametrically extending slit-form aperture 26 or the like is located around the entrance pupil 6Y of the front unit 10 to prevent entrance of flare light. FIG. 13(c) is illustrative of the panoramic taking optical system 31 of the invention attached to the endmost portion of a soft electronic endoscope 42, wherein picked up images are displayed on a display 43 after imaging processing for distortion correction.

Figure 14A:
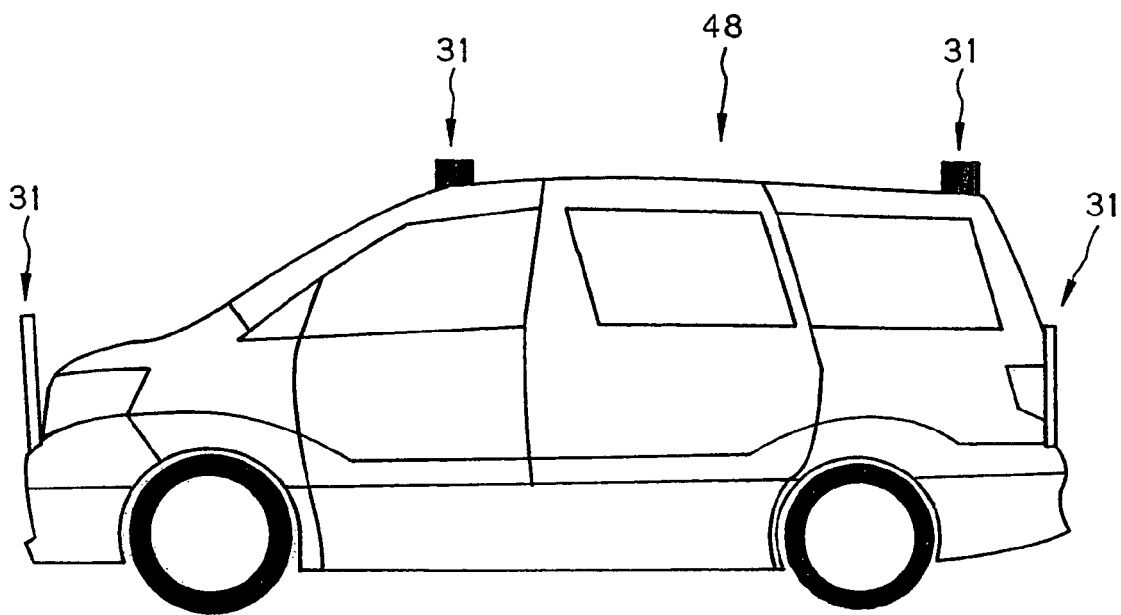
FIGS. 14(a) and 14(b) are illustrative of one example of using the panoramic taking optical system of the invention as taking optical systems at the corners and ceiling of a car.
Figure 14B:
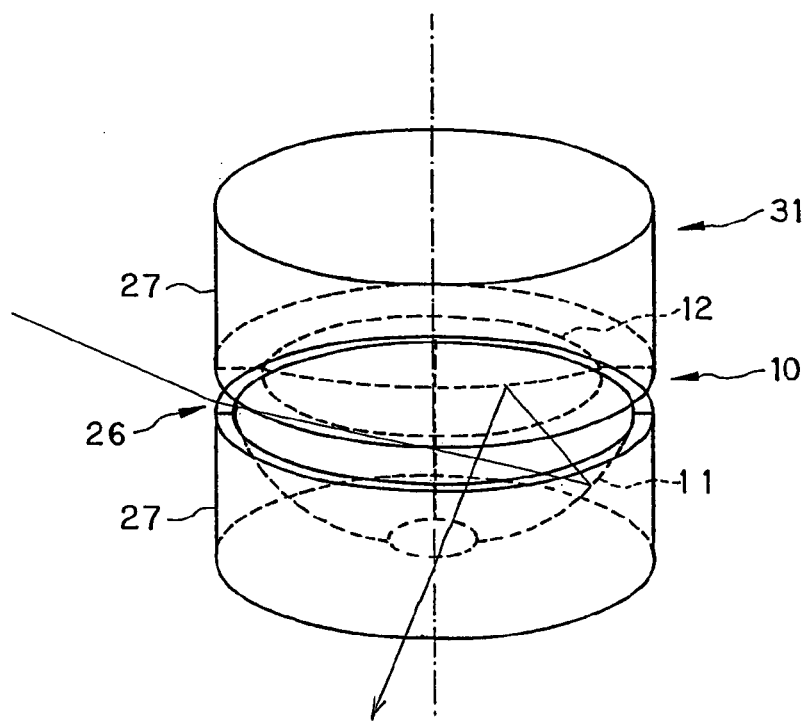

FIG. 14(a) is illustrative of a plurality of panoramic taking optical systems 31 of the invention that are attached to the corners and ceiling of a car 48 as taking optical systems to display images taken via the panoramic taking optical systems 31 simultaneously on an interior display after image processing for correction of distortion, and FIG. 14(b) is illustrative in schematic of the endmost construction of that. In the panoramic taking optical system 31 of the invention, a flare stop 27 defined by a casing having a diametrically extending slit-form aperture 26 or the like is located around the entrance pupil 6Y of the front unit 10 to prevent entrance of flare light.

Figure 15:
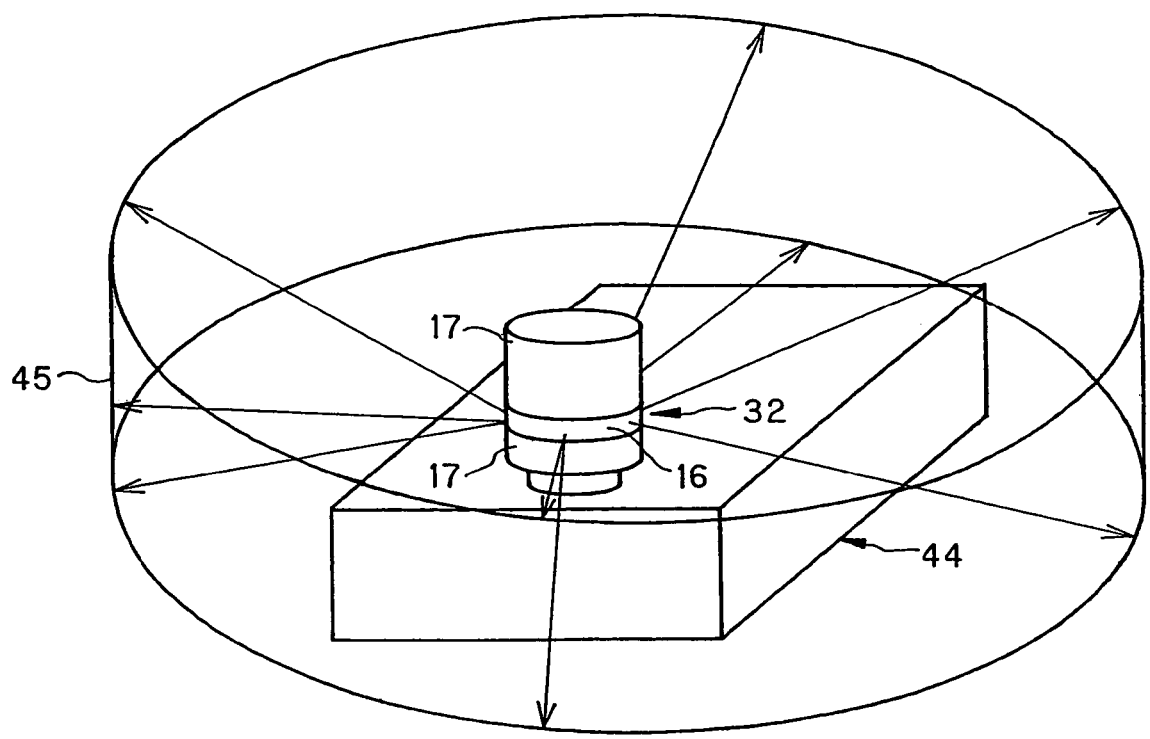
FIG. 15 is illustrative of one example of using the panoramic projection optical system of the invention as a projection optical system in a projector.

FIG. 15 is illustrative of an example of a projector 44 in which the panoramic projection optical system 32 of the invention is used as its projection optical system. A panoramic image is displayed on a display device located on the image plane of the system 32, so that a full 360°-direction image is projected and displayed on a full 360°-direction screen 45 through the panoramic optical system 32.

Figure 16:
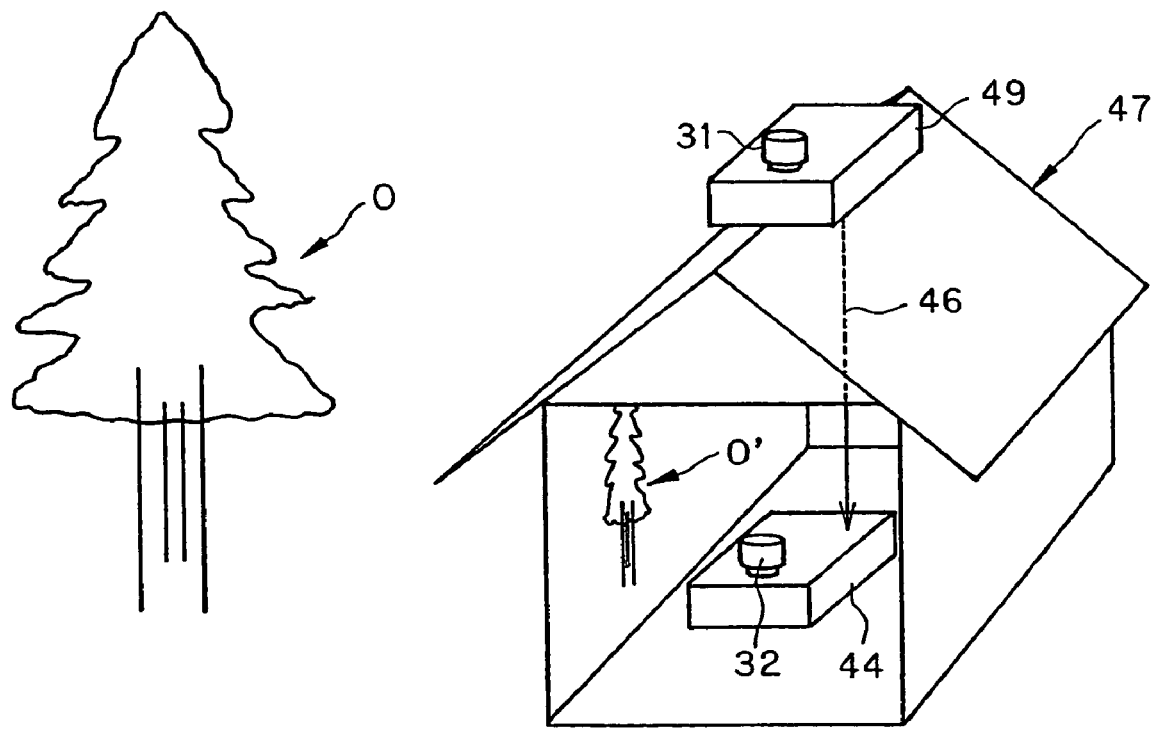
FIG. 16 is illustrative of an example of taking an image of a subject outside a house using the panoramic taking optical system of the invention to project and display it within the house through the panoramic projection optical system of the invention.

FIG. 16 is illustrative of a taking device 49 using the panoramic taking optical system 31 of the invention, which is attached to the outside of a house 47, and a projector 44 using the panoramic projection optical system 32 of the invention, which is located inside. An image picked up by the taking device 49 is sent to the projector 44 via an electric wire 46. Such being the arrangement, a full 360°-direction subject O outside the house is taken by the taking device 49 via the panoramic taking optical system 31, and the ensuing image signals are sent to the projector 44 via the electric wire 46. An image of the subject is displayed on a display device located on an image plane, so that the image O' of the subject O is projected and displayed on the inside wall surface or the like of the house via the panoramic projection optical system 32.

APPLICABILITY TO THE INDUSTRY

The invention as described above makes it possible to obtain an optical system that is adapted to obtain an image having a full 360°-direction angle of view or project an image at a full 360°-direction (full-panoramic) angle of view, and is of small-format size and well corrected for aberrations without being affected by flare light yet with high resolving power.

What we claim is:

1. An optical system, which is adapted to form an image having a full 360° (panoramic)-direction angle of view on an image plane or project an image located on an image plane at a full 360°-direction angle of view, and comprises a front unit having at least two reflecting surfaces, each rotationally symmetric about a center axis, and a rear unit that is rotationally symmetric about the center axis and has positive power, characterized in that:

said front unit includes, in order of travel of light rays in the case of an imaging system or in reverse order of travel of light rays in the case of a projection system, a first reflecting surface on which a light beam coming from afar is incident and which is located opposite to an entrance pupil in a section including a center axis with the center axis interposed between them, and a second reflecting surface located on the same side as the first reflecting surface with respect to the center axis, wherein a center of the first reflecting surface is located more on the rear unit side than a center of the second reflecting surface in a center axis direction, and the entrance pupil in the section including the center axis is located between an outer periphery of the first reflecting surface and an outer periphery of the second reflecting surface, the light beam coming from afar passes through said front unit and said rear unit in order, forming an image at a position of said image plane off the center axis, the entrance pupil is positioned off the center axis in the section including the center axis, and positioned on the center axis in a section that is orthogonal to the section including the center axis, and said rear unit is constructed of an optical system comprising at least two groups and having positive power.

2. The optical system according to claim 1, characterized in that said rear unit comprises a rotationally symmetric, coaxial dioptric system.

3. The optical system according to claim 1 or 2, characterized in that said first reflecting surface has positive power in both a meridional section and a sagittal section.

4. The optical system according to claim 1, characterized in that said second reflecting surface has negative power in both a meridional section and a sagittal section.

5. The optical system according to claim 1, characterized by further comprising an aperture that is located at any image plane side with respect to said front unit coaxially with the center axis.

6. The optical system according to claim 1, characterized in that at least one reflecting surface has a rotationally symmetric shape defined by rotation about the center axis of a line segment of any shape that has no plane of symmetry.

7. The optical system according to claim 6, characterized in that in the section including the center axis, there is a flare stop located that is adapted to limit an aperture to near an entrance pupil only in the section including the center axis.

8. The optical system according to claim 1, characterized in that at least one reflecting surface has a rotationally symmetric shape defined by rotation about the center axis of a line segment of any shape that includes an odd-number order term.

9. The optical system according to claim 8, characterized in that in the section including the center axis, there is a flare stop located that is adapted to limit an aperture to near an entrance pupil only in the section including the center axis.

10. The optical system according to claim 1, characterized in that in order of travel of light rays in the case of an imaging system or in reverse order of travel of light rays in the case of a projection system, there is a relay optical system provided that is adapted to relay an image formed on said image plane to a second image plane.

11. The optical system according to claim 10, characterized by satisfying the following condition (1):

$$5 < F_b/h0 \qquad (1)$$

where $F_b$ is a back focus of said relay optical system, and
$h_0$ is a maximum height of the image formed by said relay optical system.

12. The optical system according to claim 1, characterized by satisfying the following condition (2):

$$10° < |\tan^{-1}(h/f_r)| \quad (2)$$

where $f_r$ is a focal length of said rear unit, and
h is a maximum height of an annular image formed by said front unit.

13. An endoscope, characterized by comprising an optical system as recited in claim 1.

* * * * *